US012634687B2

(12) United States Patent
Rajendran et al.

(10) Patent No.: US 12,634,687 B2
(45) Date of Patent: May 19, 2026

(54) SECURITY PROCEDURE FOR UE'S IN 5GLAN GROUP COMMUNICATION

(71) Applicant: NEC Corporation, Tokyo (JP)

(72) Inventors: Rohini Rajendran, Chennai (IN); Nivedya Parambath Sasi, Chennai (IN); Pradheep Kumar Singaravelu, Chennai (IN); Sivabalan Arumugam, Chennai (IN); Anand Raghawa Prasad, Tokyo (JP); Hironori Ito, Tokyo (JP)

(73) Assignee: NEC CORPORATION, Tokyo (JP)

( * ) Notice: Subject to any disclaimer, the term of this patent is extended or adjusted under 35 U.S.C. 154(b) by 479 days.

(21) Appl. No.: 17/288,203

(22) PCT Filed: Oct. 29, 2019

(86) PCT No.: PCT/JP2019/042241
§ 371 (c)(1),
(2) Date: Apr. 23, 2021

(87) PCT Pub. No.: WO2020/090764
PCT Pub. Date: May 7, 2020

(65) Prior Publication Data
US 2021/0409941 A1 Dec. 30, 2021

(30) Foreign Application Priority Data
Nov. 2, 2018 (IN) .............................. 201841041573

(51) Int. Cl.
*H04W 12/06* (2021.01)
*H04W 12/08* (2021.01)
(Continued)

(52) U.S. Cl.
CPC ........... *H04W 12/06* (2013.01); *H04W 12/08* (2013.01); *H04W 48/02* (2013.01); *H04W 76/19* (2018.02); *H04W 76/34* (2018.02); *H04W 80/02* (2013.01)

(58) Field of Classification Search
CPC ..... H04W 80/02; H04W 48/02; H04W 12/08; H04W 76/34; H04W 76/19; H04W 12/06
(Continued)

(56) References Cited

U.S. PATENT DOCUMENTS 10,282,331 B1 * 5/2019 Asturias .................... G06F 9/00
10,869,263 B2 * 12/2020 Velev ...................... H04W 8/08
(Continued)

FOREIGN PATENT DOCUMENTS

WO 2018/194971 A1 10/2018
WO WO-2018199668 A1 * 11/2018 ............ H04W 60/06

OTHER PUBLICATIONS

International Search Report for PCT Application No. PCT/JP2019/042241, mailed on Feb. 11, 2020.
(Continued)

*Primary Examiner* — Josnel Jeudy
(74) *Attorney, Agent, or Firm* — Sughrue Mion, PLLC

(57) ABSTRACT

This disclosure is related to the security procedures for UE (300) in 5GLAN Group Communication. Security procedure involved in this disclosure is based on Authentication and authorization of UE (300) by Group Management Function (GMF) (500) in 5GLAN communication, attachment and detachment of UE (300) in 5GLAN Group due to state transition and the access restrictions imposed on UE (300) during state transition.

2 Claims, 21 Drawing Sheets

(51) Int. Cl.

| | | |
|---|---|---|
| *H04W 48/02* | (2009.01) | |
| *H04W 76/19* | (2018.01) | |
| *H04W 76/34* | (2018.01) | |
| *H04W 80/02* | (2009.01) | |

(58) Field of Classification Search
USPC ........................................................... 726/2
See application file for complete search history.

(56) References Cited

U.S. PATENT DOCUMENTS

| | | | | |
|---|---|---|---|---|
| 10,904,739 | B2 * | 1/2021 | Lee ........................ | H04W 24/04 |
| 11,202,330 | B2 * | 12/2021 | Park ....................... | H04W 60/00 |
| 11,445,335 | B2 * | 9/2022 | Li ........................... | H04W 4/08 |
| 12,063,709 | B2 * | 8/2024 | Wang .................. | H04L 67/1046 |
| 12,356,504 | B2 * | 7/2025 | Jung ..................... | H04W 8/186 |
| 2019/0387401 | A1 | 12/2019 | Liao et al. | |
| 2020/0059761 | A1 * | 2/2020 | Li ........................... | H04W 12/06 |
| 2021/0409941 | A1 * | 12/2021 | Rajendran ............. | H04W 80/02 |
| 2024/0056321 | A1 * | 2/2024 | Xu ......................... | H04L 12/413 |

OTHER PUBLICATIONS

3rd Generation Partnership Project, "Technical Specification Group Services and System Aspects; Vocabulary for 3GPP Specifications (Release 15)", 3GPP TR 21.905 V15.0.0, Mar. 2018, pp. 1-66.

3rd Generation Partnership Project, "Technical Specification Group Services and System Aspects; Security architecture and procedures for 5G system (Release 15)", 3GPP TS 33.501 V15.2.0, Sep. 2018, pp. 1-176.

3rd Generation Partnership Project, "Technical Specification Group Services and System Aspects; Study on 5GS Enhanced support of Vertical and LAN Services (Release 16)", 3GPP Draft TR 23.734 V0.3.0, Oct. 2018, pp. 1-94.

3rd Generation Partnership Project, "Technical Specification Group Services and System Aspects; Feasibility Study on LAN Support in 5G (Release 16)", 3GPP TR 22.821 V16.1.0, Jun. 2018, pp. 1-52.

3rd Generation Partnership Project, "Technical Specification Group Radio Access Network; NR; Radio Resource Control (RRC) protocol specification (Release 15)", 3GPP TS 38.331 V15.3.0, Sep. 2018, pp. 1-445.

3rd Generation Partnership Project, "Technical Specification Group Services and System Aspects; System Architecture for the 5G System; Stage 2 (Release 15)", 3GPP TS 23.501 V15.3.0, Sep. 2018, pp. 1-226.

3rd Generation Partnership Project. "Technical Specification Group Services and System Aspects; Procedures for the 5G System; Stage 2 (Release 15)", 3GPP TS 23.502 V15.3.0, Sep. 2018, pp. 1-329.

* cited by examiner

SECURITY PROCEDURE FOR UE'S IN 5GLAN GROUP COMMUNICATION

This application is a National Stage Entry of PCT/JP2019/042241 filed on Oct. 29, 2019, which claims priority from Indian Patent Application number 201841041573 filed on Nov. 2, 2018, the contents of all of which are incorporated herein by reference, in their entirety.

TECHNICAL FIELD

This disclosure is related to the security procedures for UE's in 5GLAN Group Communication.

BACKGROUND ART 5G expands the scope and reach of 3GPP-defined technologies. There are multiple market segments in the realm of residential, office, enterprise and factory, where 5G will need to provide services with similar functionalities to Local Area Networks (LANs) and VPN's but improved with 5G capabilities (e.g., high performance, long distance access, mobility and security). The 5G system shall support 5G LAN-type services in a shared RAN configuration over a wide area mobile network.

The 5G System shall support on-demand establishment of a point to point UE to UE private communication connections between UEs using the same 5G LAN-VN with multiple types of data communication. At least IP and Ethernet should be supported. The 5G network shall support service continuity for 5G LAN-type service, i.e., the private communication between UEs shall not be interrupted when one or more UEs of the private communication move within the same network that provides the 5G LAN-type service.

The 5G network shall enable the UEs using a 5G LAN-VN to use the multicast/broadcast addresses to communicate with required latency (e.g. 180 ms). The 5G system shall support use of unlicensed as well as licensed spectrum for 5G LAN-type services. The 5G system shall enable the network operator to provide the same 5G LAN-type service to any 5G UE, regardless of whether it is connected via public base stations, indoor small base stations connected via fixed access, or via relay UEs connected to either of these two types of base stations.

A Private DNN uniquely identifies a 5GLAN group and all the member UEs of the same group need to establish a PDU Session towards the same Private DNN for 5GLAN group communication. TR 23.734 (NPL 3) defines how UE's are added to the 5GLAN group or deleted from the group, but the security procedure necessary for authenticating/authorizing UE's to the 5GLAN Group, handling of 5GLAN UE security context and 5GLAN UE access restrictions has not been addressed based on the new network function, GMF introduced in the 5G system architecture for 5GLAN Group Communication. FIG. 1 illustrates a 5GLAN type service architecture.

CITATION LIST

Non Patent Literature

NPL 1: 3GPP TR 21.905, "Vocabulary for 3GPP Specifications", V15.0.0 (2018 March)

NPL 2: 3GPP TS 33.501, "Security architecture and procedures for 5G system", V15.2.0 (2018 September)

NPL 3: 3GPP DRAFT-TR 23.734-030-rm, "Study on 5GS Enhanced support of Vertical and LAN Services"

NPL 4: 3GPP TR 22.821, "Feasibility Study on LAN Support in 5G (Describes Use case and potential requirements for 5GLAN service)", V16.1.0 (2018 June)

NPL 5: 3GPP TS 38.331, "Radio Resource Control (RRC) protocol specification", V15.3.0 (2018 September)

NPL 6: 3GPP TS 23.501, "System Architecture for the 5G System", V15.3.0 (2018 September)

NPL 7: 3GPP TS 23.502, "Procedures for the 5G System", V15.3.0 (2018 September)

SUMMARY OF INVENTION

Technical Problem

Main Problem Statement:

UE's message transmission and accessing of 5GLAN type services are prone to attacks due to the nature of 5GLAN Group communication in 5G system. Attacks like impersonate attack, unauthorized access by the attackers, DDoS attacks, eavesdropping, etc. may considered as major threat to 5GLAN group. The 5GLAN group communication requires high levels of security mechanism in order to secure the message transmission and access permission in vertical domains. And also, the security procedures of UE's in 5GLAN group were not addressed in 5GLAN Group Communication. We have proposed the security procedures for GMF that involves problem related to authentication/authorization of 5GLAN UE's in 5GLAN Group. The following are the sub problems related to security procedure for UE's in 5GLAN Group communication:

Sub-Problem Statement 1: Authentication/authorization of UE's by GMF in a 5GLAN Group TR 23.734 (NPL3) clause 6.14.2 provides high level solution for authorization of UE in 5GLAN group communication by GMF. The detailed security procedure for GMF was not addressed for 5GLAN Group communication.

The main threat of the scenario is attackers may impersonate as genuine UE's in 5GLAN UE services and may try to eavesdrop the 5GLAN services provisioned by the 5GLAN group.

So, attacker may access the unauthorised services which are available in 5GLAN group communication.

Sub-Problem Statement 2: Handling of 5GLAN UE Related Security Context During State Transitions Handling of 5GLAN UE related security context by GMF during Idle/Inactive/Failure/Subscription expiry has not been addressed.

Sub-Problem Statement 3: Handling of Access Restrictions by GMF for Provisioning 5GLAN Service to the UEs Based on its Transition States (Such as Idle/Inactive) is Missing During state transitions GMF may provide all the 5GLAN-type services to the UE's. UE's in idle/inactive mode may exploit the services provided by the 5GLAN.

Therefore, UE's in states other than connected should be provided limited access to the 5GLAN-services allowed based on UE's state.

Benefits:

Sub Problem 1:

1. Mitigation of eavesdropping attacks by adversary's in the 5GLAN group communication.

2. Restriction of 5GLAN UEs from unauthorized access in 5GLAN Group Communication.

Sub Problem 2:

1. Mitigation of DDoS attacks and impersonate attacks in the 5GLAN group communication.

Sub Problem 3:

1. Mitigation of data theft, impersonation attacks and privacy of other 5GLAN UE's who were provisioned in 5GLAN Group.

Benefit of Using $K_{GMF}$:

We have proposed a new security context in GMF of 5GLAN group communication i.e. $K_{GMF}$. The main objective of introducing $K_{GMF}$ is to secure (authenticity/integrity/confidentiality) the message transmission among the 5GLAN type services and UE's. By using $K_{GMF}$, we shall introduce the anonymity for 5GLAN UE's and privacy for 5GLAN services that are provisioned in 5GLAN Group communication.

In view of the problems described above, the present disclosure aims to provide a solution to solve at least one of the various problems.

Solution to Problem

A method for a 5GLAN Group Communication according to the present disclosure includes sending, by a User Equipment (UE), a Registration Request along with a 5GLAN member id and a MAC address to an Access and Mobility Management Function (AMF), sending, by the AMF, a Nausf_Authentication request to an Authentication Server Function (AUSF), sending, by the AUSF, a Nudm_Authentication request to a Unified Data Management (UDM) after receiving the Nausf_Authentication request, sending, by the UDM, a Nudm_Authentication response to the AUSF, sending, by the AUSF, a Nausf_Authentication response to the AMF on receiving the Nudm_Authentication response from the UDM, and an authentication procedure takes place between the UE and the 5G Core Network (5GC), sending, by the AMF, a Get UE subscription data request to the UDM, sending, by the UDM, a UE related subscription data to the AMF as a response to the Get UE subscription data request, checking, by the AMF, the UE related subscription data and determining an allowed 5GLAN-type services to the particular UE, sending, by the AMF, a UE Group Authentication request to a Group Management Function (GMF) after determining the allowed 5GLAN services, deriving, by the GMF, a Key for Group Management Function ($K_{GMF}$) used to derive a $K_{GMFint}$ and a $K_{GMFenc}$, these keys are used for integrity and confidentiality protection of the sensitive information sent by the UE to the GMF via the AMF, sending, by the GMF, a UE Group Authentication response including the 5GLAN member id, the MAC address and a UE Group Configuration to the AMF, sending, by the AMF, a Registration Accept with the 5GLAN member id, the MAC address and the UE Group Configuration on receiving the UE Group Authentication response and the UE Group Configuration, and deriving, by the UE, the $K_{GMF}$ used for deriving the $K_{GMFint}$ and the $K_{GMFenc}$, and a connection is established between the UE and a 5GLAN group after successful key derivation.

A method for a 5GLAN Group Communication according to the present disclosure includes sending, by a User Equipment (UE), an Authorization Permission Request along with a 5GLAN member id and a MAC address to an Access and Mobility Management Function (AMF), sending, by the AMF, a Nausf_Authentication request to an Authentication Server Function (AUSF), sending, by the AUSF, a Nudm_Authentication request to a Unified Data Management (UDM) after receiving the Nausf_Authentication request, sending, by the UDM, a Nudm_Authentication response to the AUSF, sending, by the AUSF, a Nausf_Authentication response to the AMF on receiving the Nudm_Authentication response from the UDM, and an authentication procedure takes place between the UE and the 5G Core Network (5GC), sending, by the AMF, a Get UE subscription data request to the UDM, sending, by the UDM, a UE related subscription data to the AMF as a response to the Get UE subscription data request, checking, by the AMF, the UE related subscription data and determining an allowed 5GLAN-type services to the particular UE, sending, by the AMF, a UE Group Authorization request to a Group Management Function (GMF) after determining the allowed 5GLAN services, verifying, by the GMF, a Key for Group Management Function ($K_{GMF}$) and provisioning the access permissions for the UE in a 5GLAN group for the 5GLAN-type services, sending, by the GMF, a UE Group Authorization Response along with a UE Group Configuration to the AMF, sending, by the AMF, an Authorization Permission Response with the list of allowed 5GLAN-type services to the UE, and updating, by the UE, the authorization permission with the allowed 5GLAN-type services.

A method for a 5GLAN Group Communication according to the present disclosure includes sending, by a User Equipment (UE), an RRC connection re-establishment request to a gNB on state transition from Idle state to connected state after the 5GLAN Group is created and members are added to the 5GLAN group, responding, by the gNB, with an RRC setup to the UE on receiving the RRC connection re-establishment request, sending, by the UE, an RRC setup complete to the gNB on reception of the RRC setup from the gNB, sending, by the UE, a PDU session re-establishment request to an Access and Mobility Management Function (AMF), forwarding, by the AMF, the PDU session re-establishment request to a Unified Data Management (UDM), sending, by the UDM, a PDU session re-establishment response to the AMF on receiving the PDU session re-establishment request, sending, by the gNB, a UE state notification to the AMF in order to notify the state of the UE, requesting, by the AMF, to retrieve a UE security context based on the UE's state to a Group Management Function (GMF) on reception of the UE state notification, and sending, by the GMF, the UE security context in a response to the AMF and a connection is established.

A method for a 5GLAN Group Communication according to the present disclosure includes sending, by a User Equipment (UE), an RRC connection re-establishment request to a gNB, on state transition from Inactive state to connected state after the 5GLAN Group is created and members are added to the 5GLAN group, responding, by the gNB, with an RRC setup to the UE on receiving the RRC connection re-establishment request, sending, by the UE, an RRC setup complete to the gNB on reception of the RRC setup from the gNB, sending, by the UE, a PDU session re-establishment request to an Access and Mobility Management Function (AMF), forwarding, by the AMF, the PDU session re-establishment request to a Unified Data Management (UDM), sending, by the UDM, a PDU session re-establishment response to the AMF on receiving the PDU session re-establishment request, sending, by the gNB, a UE state notification to the AMF in order to notify the state of the UE, requesting, by the AMF, to retrieve a UE security context based on the UE's state to a Group Management Function (GMF) on reception of the UE state notification, and sending, by the GMF, the UE security context in a response to the AMF and a connection is established.

A method for a 5GLAN Group Communication according to the present disclosure includes sending, by a User Equipment (UE), a Registration Request to an Access and Mobility Management Function (AMF) after the 5GLAN Group is created and members are added to the 5GLAN group, authenticating, by the AMF, the UE to the network, getting, by the AMF, UE a UE subscription data from a Unified Data Management (UDM) after a UE Authentication takes place between the UE and the 5G Core Network (5GC), determining, by the AMF, the 5GLAN-type services which are allowed for the authenticated UE, sending, by the AMF, a UE Group Authentication request for authenticating the UE for group communication to a Group Management Function (GMF), taking place, between the UE and the GMF in the 5GLAN Group, a UE group authentication procedure, sending, by the GM, a UE Group Authentication Failure response with a cause value to the AMF during Group authentication failure, and sending, by the AMF, a Registration denied to the UE via the gNB as a response for the UE Group Authentication failure.

A method for a 5GLAN Group Communication according to the present disclosure includes sending, by a User Equipment (UE), an RRC release request to a gNB on state transition from connected state to idle state after the 5GLAN Group is created and members are added to the 5GLAN group, sending, by the gNB, an RRC release as a response to the RRC release request sent by the UE, sending, by the UE, a PDU session release request to an Access and Mobility Management Function (AMF) on reception of the RRC release response, forwarding, by the AMF, the PDU session release request to a Unified Data Management (UDM) via a Session Management Function (SMF), sending, by the UDM, a PDU session release response to the AMF as response to the PDU session release request, requesting, by the AMF, to remove a UE related security context to a Group Management Function (GMF) on reception of the PDU session release response, sending, by the GMF, a response to a request for removing the UE related security context to the AMF on receiving the request for removing the UE related security context, and sending, by the AMF, an acknowledgement to removal of the UE security context to the UE via the gNB.

A method for a 5GLAN Group Communication according to the present disclosure includes sending, by a User Equipment (UE), an RRC release request to a gNB on state transition from connected state to inactive state after the 5GLAN Group is created and members are added to the 5GLAN group, sending, by the gNB, an RRC release as a response to the RRC release request sent by the UE, sending, by the UE, a PDU session release request to an Access and Mobility Management Function (AMF) on reception of the RRC release response, forwarding, by the AMF, the PDU session release request to a Unified Data Management (UDM) via a Session Management Function (SMF), sending, by the UDM, a PDU session release response to the AMF as response to the PDU session release request, requesting, by the AMF, to remove a UE related security context to a Group Management Function (GMF) on reception of the PDU session release response, sending, by the GMF, a response to a request for removing the UE related security context to the AMF on receiving the request for removing the UE related security context, and sending, by the AMF, an acknowledgement to removal of the UE security context to the UE via the gNB.

A method for a 5GLAN Group Communication according to the present disclosure includes sending, by a User Equipment (UE), an RRC release request to a gNB on state transition after the 5GLAN Group is created and members are added to the 5GLAN group, sending, by the gNB, an RRC release as a response to the RRC release request sent by the UE, sending, by the UE, a PDU session release request to an Access and Mobility Management Function (AMF) on reception of the RRC release response, forwarding, by the AMF, the PDU session release request to a Unified Data Management (UDM) via a Session Management Function (SMF), sending, by the UDM, a PDU session release response to the AMF as response to the PDU session release request, requesting, by the AMF, to remove a UE related security context to a Group Management Function (GMF) on reception of the PDU session release response, waiting, by the AMF, for a response of the GMF for a particular instance of time, and sending, by the AMF, a Request failure response with the cause value to the UE when the AMF does not receives any response.

A method for a 5GLAN Group Communication according to the present disclosure includes sending, by a User Equipment (UE), an RRC release request to a gNB on subscription expiry after the 5GLAN Group is created and members are added to the 5GLAN group, sending, by the gNB, an RRC release as a response to the RRC release request sent by the UE, sending, by the UE, a PDU session release request to an Access and Mobility Management Function (AMF) on reception of the RRC release response, forwarding, by the AMF, the PDU session release request to a Unified Data Management (UDM) via a Session Management Function (SMF), sending, by the UDM, a PDU session release response to the AMF as response to the PDU session release request, requesting, by the AMF, to remove a stored UE subscription profile to a Group Management Function (GMF) on reception of the PDU session release response, removing, by the GMF, the UE from a 5GLAN group member list on reception of the request for removing the UE subscription profile, sending, by the GMF, a UE subscription removal profile response to the AMF, and sending, by the AMF, an acknowledgement to removal of the UE subscription profile as well as the UE from the 5GLAN group member list to the UE via the gNB.

A method for a 5GLAN Group Communication according to the present disclosure includes sending, by a gNB, a UE state notification to an Access and Mobility Management Function (AMF) to report a current RRC state for a User Equipment (UE) when the UE is not in connected state after the 5GLAN Group is created and members are added to the 5GLAN group, forwarding, by the AMF, the UE state notification to a Group Management Function (GMF), checking, by the GMF, a local policy based on the UE state notification according to a pre-provisioned access restrictions, restricting, by the GMF, an access to 5GLAN-type services to the UE based on the UE's state, sending, by the GMF, an acknowledgement of the forwarded UE state notification in order to notify the AMF about the restricted 5GLAN-type services for the particular UE, and forwarding, by the AMF, the acknowledgement to the gNB to notify the UE about the restricted 5GLAN-type services.

DESCRIPTION OF EMBODIMENTS

1. Abbreviations

Figure 1:
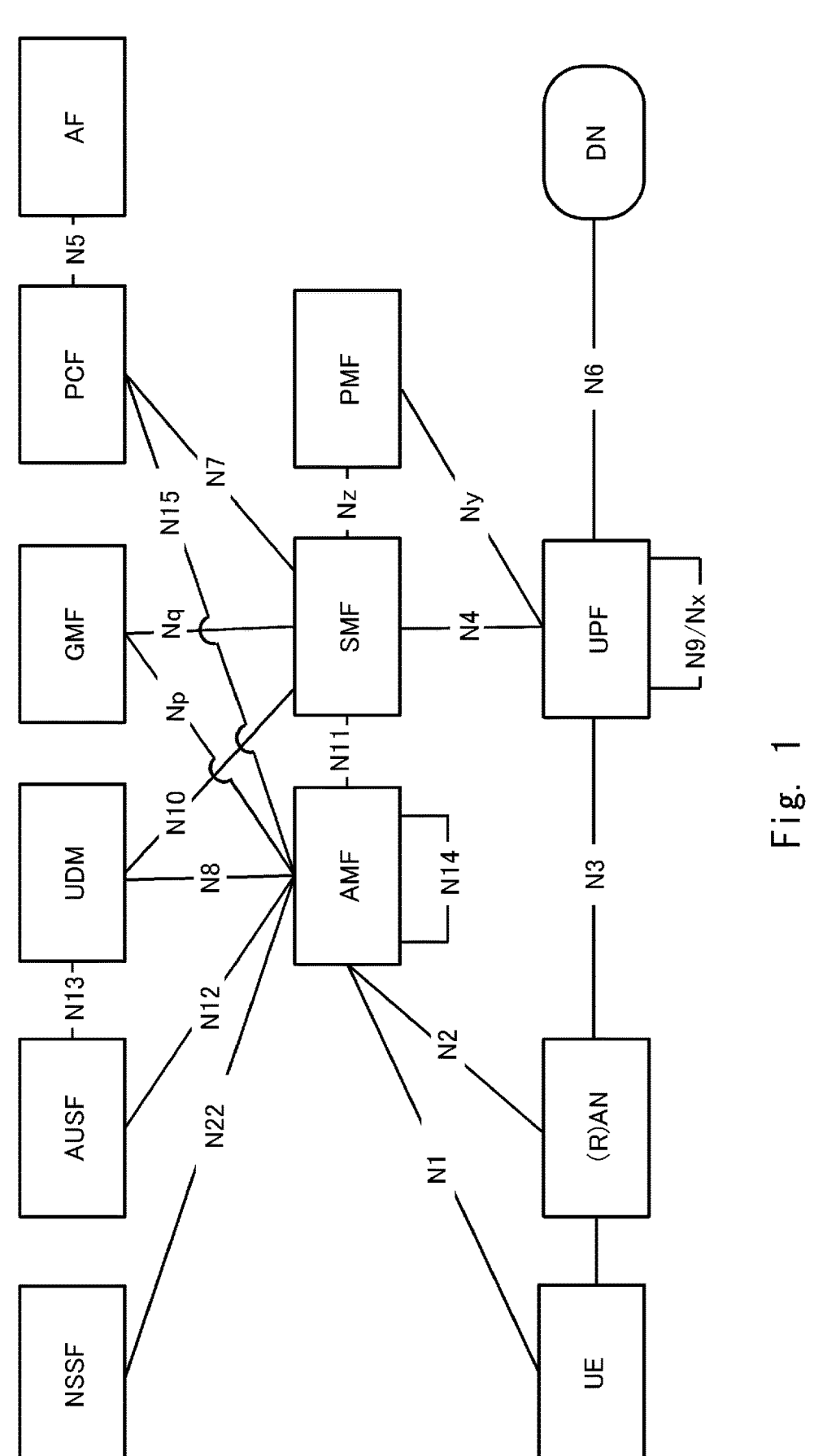
FIG. 1 illustrates a 5GLAN type service architecture.

For the purposes of the present document, the abbreviations given in TR 21.905 (NPL 1) and the following apply. An abbreviation defined in the present document takes precedence over the definition of the same abbreviation, if any, in TR 21.905 (NPL 1).

5GC 5G Core Network
5GS 5G System
5G-AN 5G Access Network
5G-GUTI 5G Globally Unique Temporary Identifier
5G S-TMSI 5G S-Temporary Mobile Subscription Identifier
AMF Access and Mobility Management Function
AN Access Node
AS Access Stratum
AUSF Authentication Server Function
CP Control Plane
CM Connection Management
DL Downlink
DN Data Network
DNAI DN Access Identifier
DNN Data Network Name
ECIES Elliptic Curve Integrated Encryption Scheme (ECIES)
EPC Evolved Packet Core
FQDN Fully Qualified Domain Name GMF Group Management Function
GPSI Generic Public Subscription Identifier
GUAMI Globally Unique AMF Identifier
HR Home Routed (roaming)
KDF Key Derivation Function
$K_{GMF}$ Key for Group Management Function
MAC Medium Access Control
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
PLMN Public land mobile network
PPD Paging Policy Differentiation
PMF Path Management Function
(R)AN (Radio) Access Network
RLC Radio Link Control
RRC Radio Resource Control
SBA Service Based Architecture
SEAF Security Anchor Functionality
SMF Session Management Function
S-NSSAI Single Network Slice Selection Assistance Information
SUCI Subscription Concealed Identifier
SUPI Subscription Permanent Identifier
UPF User Plane Function
UDR Unified Data Repository

2. Definitions

For the purposes of the present document, the terms and definitions given in TR 21.905 (NPL 1) and the following apply. A term defined in the present document takes precedence over the definition of the same term, if any, in TR 21.905 (NPL 1).

3. Information on the Related Art 3.1 5G LAN-Type Service and 5GLAN Communications A Private DNN uniquely identifies a 5GLAN group and all the member UEs of the same group need to establish a PDU Session towards the same Private DNN for 5GLAN group communication.

Reserved special labels in the DNN syntax can easily indicate whether it's a Private DNN. Private DNNs might be preconfigured in the network and the group member UEs. They may be also dynamically created on demand by the operator or the group owners/administrators, as part of the 5GLAN group creation.

When a new Private DNN is created on demand, the information may be propagated into the concerned network entities (e.g. AMF, SMF, UDR, etc.) in the core network and group member UEs may receive the Private DNN information, together with the related configurations such as the Service Area configuration, via NAS procedures (e.g. Registration or UE Configuration Update).

A 5GLAN group member UE establishes a dedicated PDU Session towards the target Private DNN before it can communicate with the group. The legacy PDU Session management procedures can be reused for group communication.

According to the Private DNN, the network selects the appropriate network functions (e.g. SMFs and UPFs) for the UEs of the same group. For example, all the UEs of the same group and in the same local area may be assigned the same SMF and UPF.

Figure 2:
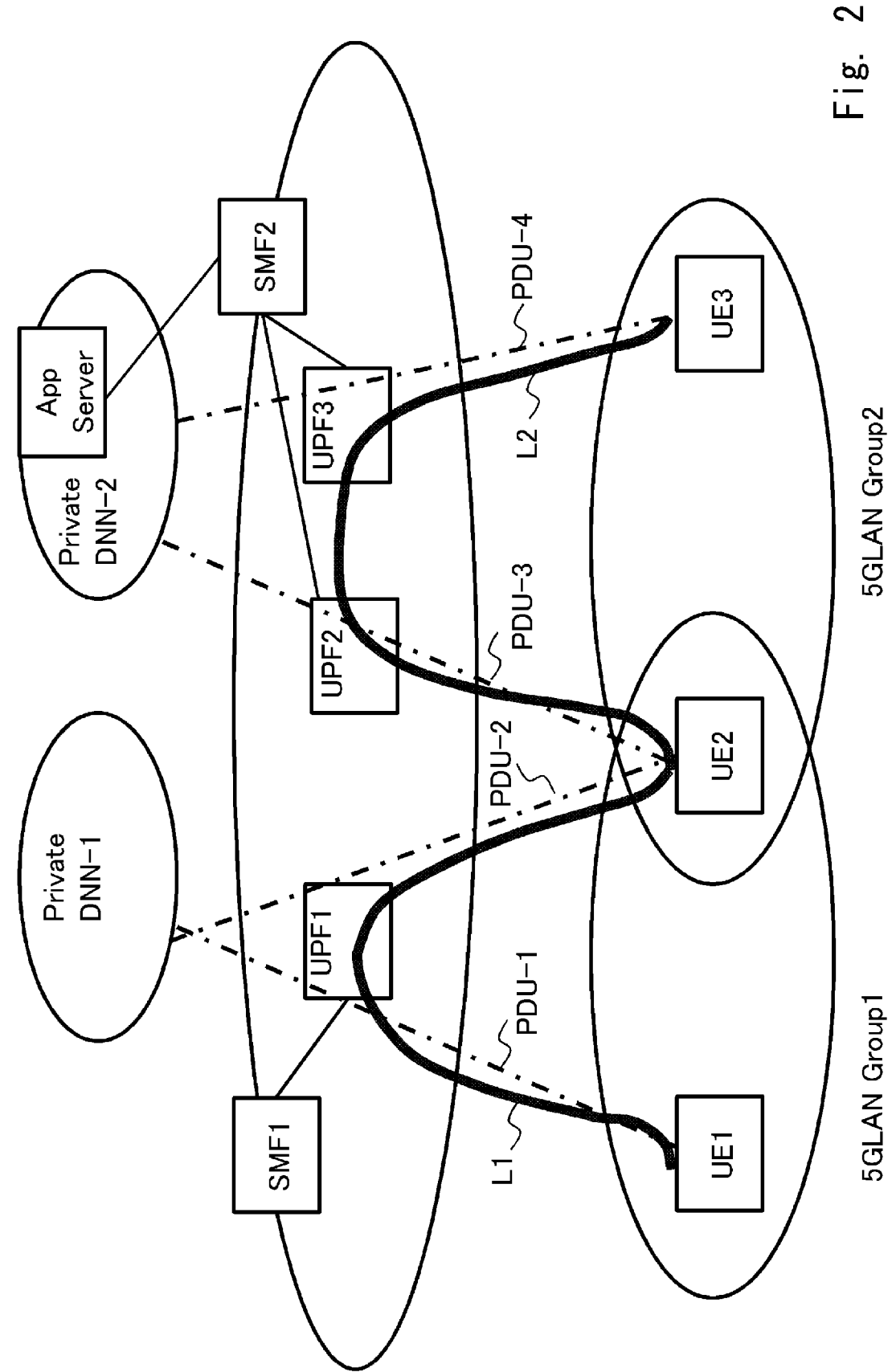
FIG. 2 illustrates a Private DNN for 5GLAN communication.
Figure 3:
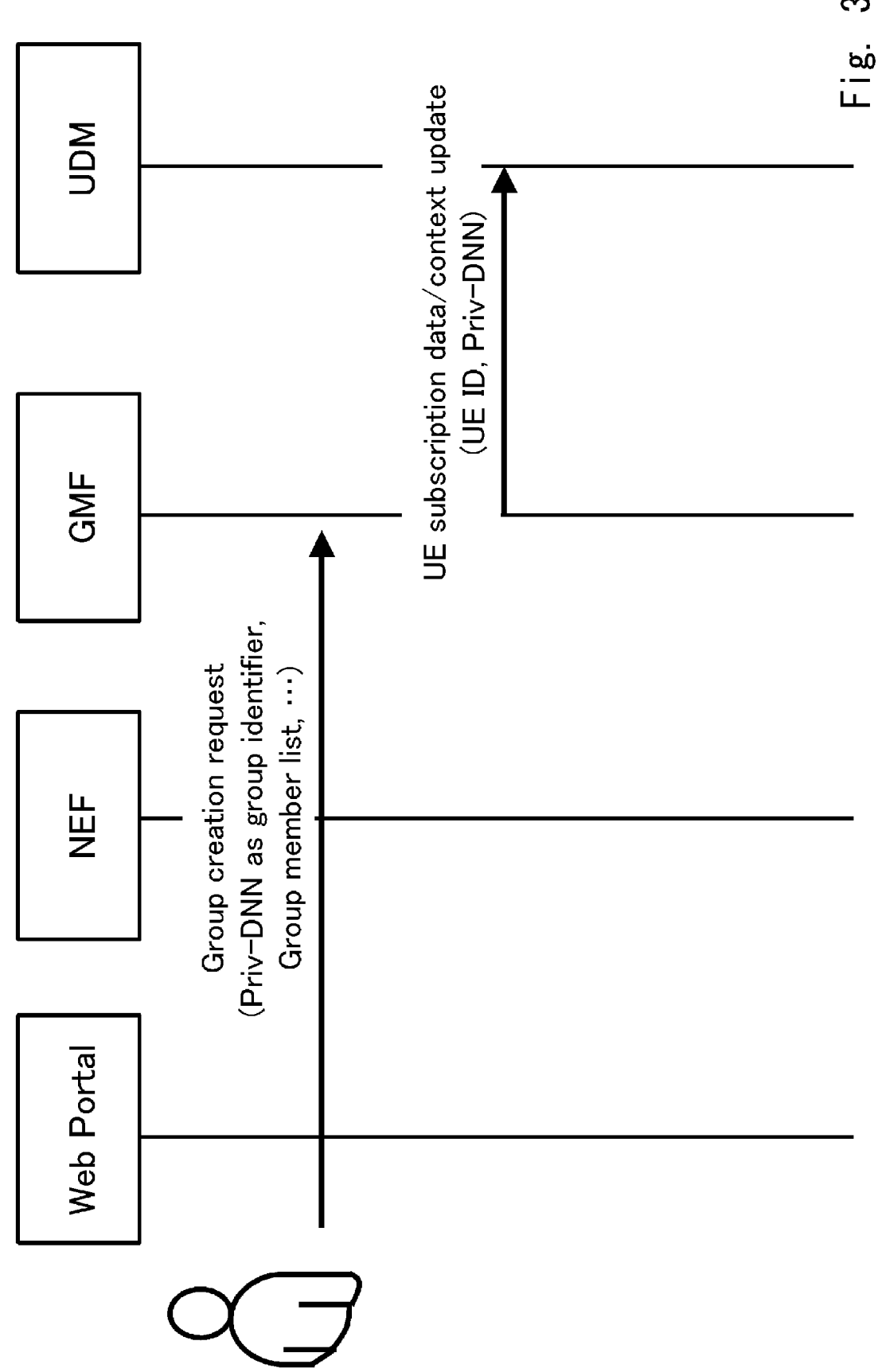
FIG. 3 illustrates a procedure for Private DNN creation during 5GLAN group creation.

FIG. 2 illustrates about the Private DNN for 5GLAN communication. In the figure there are two 5GLAN groups: 5GLAN Group 1 which includes of UE1 and UE2, and 5GLAN Group 2 which includes of UE2 AND UE3. UE2 is in both Group 1 and Group 2. Each UE establishes the PDU Session (dotted line) towards the Private DNN corresponding to its group. The real group traffic (L1 and L2 line) goes between UPFs selected for the group, under the control of the SMF or App Server, without going to the DN. FIG. 3 illustrates a procedure for Private DNN creation during 5GLAN group creation.

Figure 4:
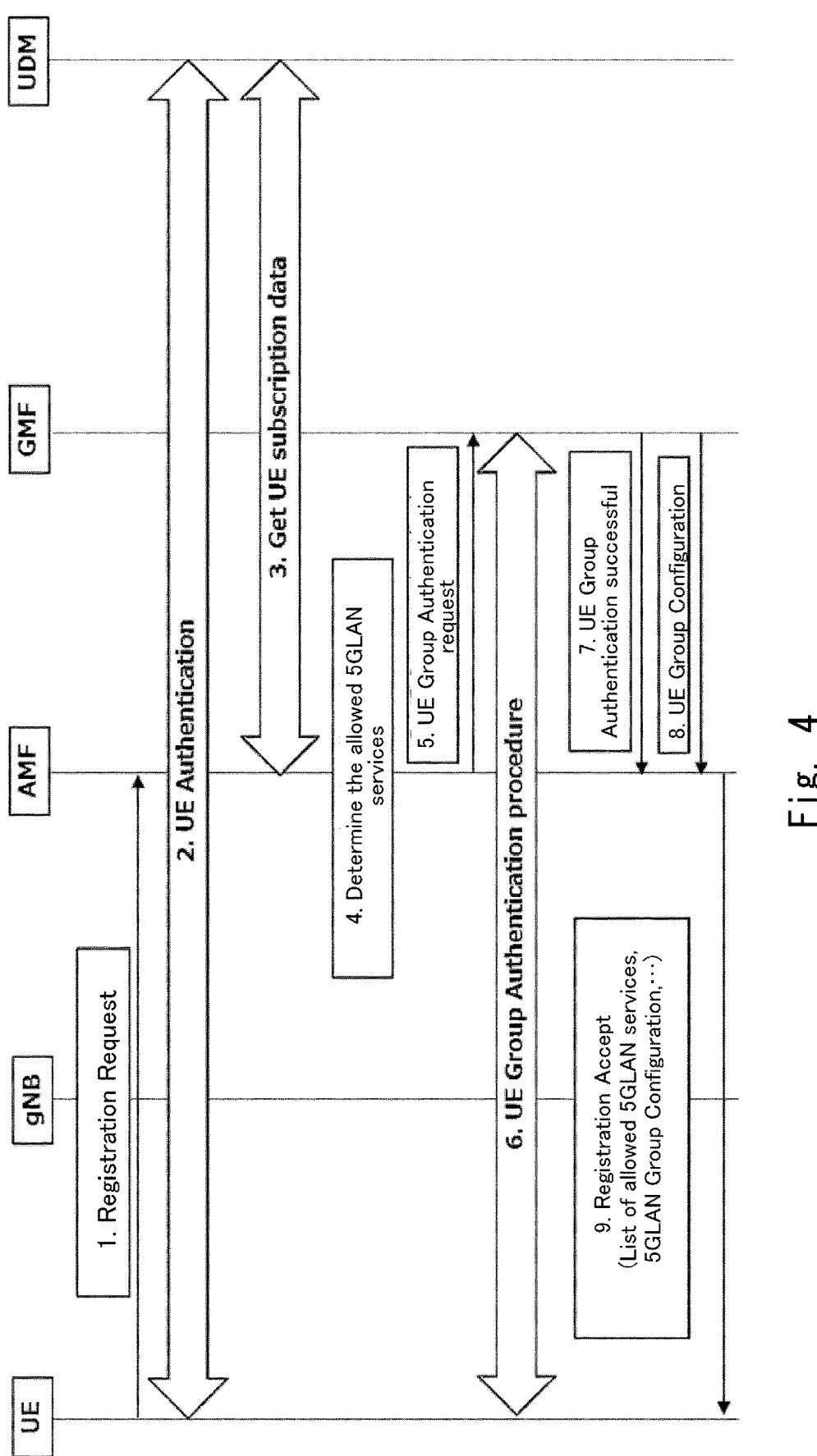
FIG. 4 illustrates a procedure for 5GLAN group discovery and configuration through Registration.

FIG. 4 illustrates the high-level procedure how a 5GLAN capable UE may discover its allowed 5GLAN groups and receives the corresponding group configurations. The procedure involves the following steps:

1. The UE initiates Registration and include its 5GLAN capability in the Registration Request message. The UE may indicate its 5GLAN capability and optionally include a list of its pre-configured P-DNNs if available.
2. The UE is authenticated.
3. The serving AMF retrieves the UE subscription/context data from the UDM.
4. The AMF recognizes that the UE belongs to one or more 5GLAN groups based on subscription data or pre-configured P-DNNs. It further determines which 5GLAN service/groups are allowed based on local configurations.
5. The AMF may initiate the group authentication/authorization towards the 5GLAN-GMF. It is also possible that group authentication/authorization may be conducted at a later time after Registration completes.
6-7. The 5GLAN-GMF authenticates/authorizes the UE for the group communication.
8. The AMF also receives the corresponding group configuration parameters.
9. The AMF returns the list of allowed 5GLAN service/groups (e.g. P-DNNs) and corresponding configurations to the UE. The UE stores the information for future 5GLAN group communication.

3.2 Basic Architecture for Supporting Dynamic 5G LAN-Type Service and 5GLAN Communication A 5GLAN Group may be managed (i.e. created, modified, and removed) based on AF request or UE request. A UE that belongs to the 5GLAN Group can access the 5G LAN-type service corresponding to the 5GLAN Group. 5GLAN Groups are isolated from each other, that is, communication between 5GLAN Groups is not supported.

Figure 5:
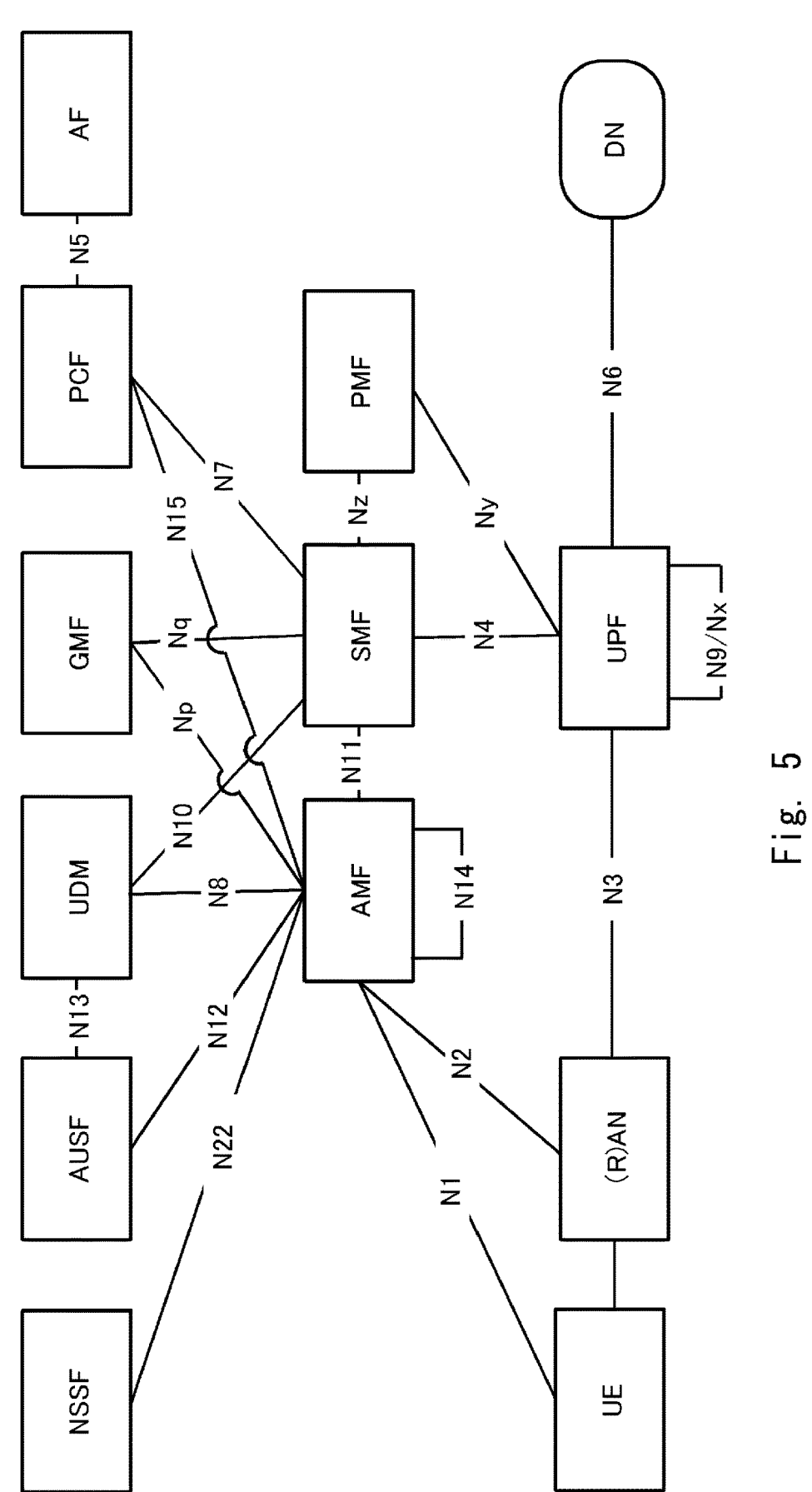
FIG. 5 illustrates a 5G LAN-type service architecture with Point-to-Point presentation.

FIG. 5 depicts the 5G LAN-type service architecture with Point-to-Point presentation.

To enable 5G LAN-type service, the 5GC is enhanced with the following functions/functionalities in the control plane:

Group Management Function (GMF): The GMF is responsible for 5GLAN Group management, including creating, modifying or removing a 5GLAN Group, according to authorised request from the UE or the AF. The GMF is also responsible for authentication/authorization of UEs for accessing 5G LAN-type service.

Path Management Function (PMF): The PMF is responsible for managing the UP path to support 5GLAN communication within a 5GLAN group and to ensure desired isolation. During the UP management, the PMF takes into account UE location information, and DNAI information (if available). PMF retrieves the UE PDU session information from the SMF.

SMF enhancements: Perform 5GLAN group authentication and authorization with GMF during PDU Session establishment/modification procedure; configure packet handling rules (e.g. packet routing & forwarding rules, packet marking rules) in the UPF to support 5GLAN communication. SMF interacts with PMF in order for the UP path management of 5G LAN-type service.

Figure 6:
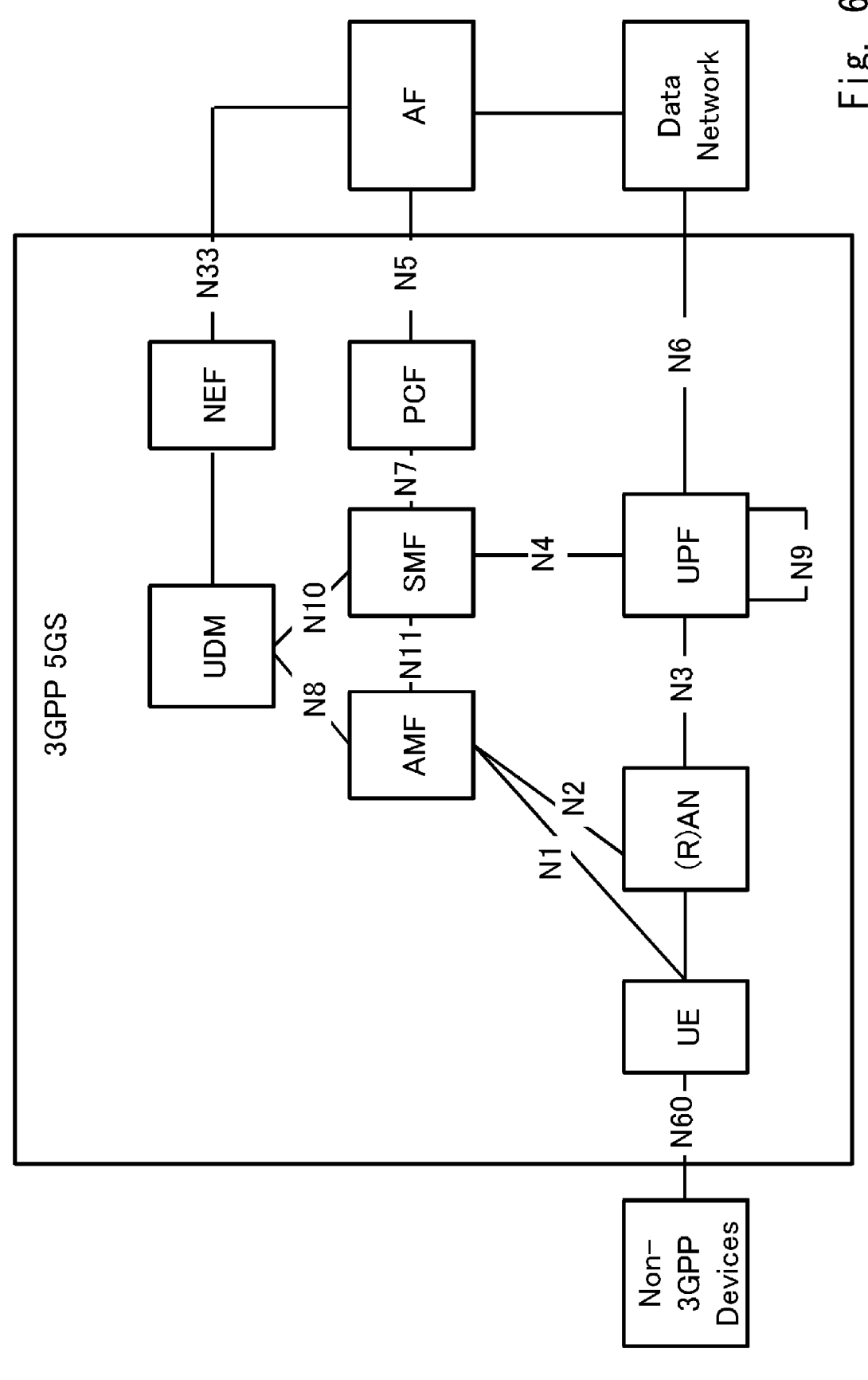
FIG. 6 illustrates a system architecture of the 5GS with internal and external interfaces.

3.3 System Architecture for Supporting Service Exposure for Creation and Management of a 5GLAN Group FIG. 6 illustrates a system architecture of the 5GS with internal and external interfaces.

Configuration of the UE is performed from a logical Application Function (AF) that configures the UE via the PCF directly or indirectly via the NEF first and the PCF second.

AF request (to get notified about events related with PDU sessions) sent to PCF via N5: requests targeting specific ongoing PDU session of individual UE (direct).

AF request sent PCF via NEF: targets existing or future PDU session of multiple PDUs or of any UE and may target multiple PCF.

PCF transforms the AF requests in to policies that apply to PDU sessions

AF has subscribed to UP path management event notification from SMF Manual configuration of network.

Instantiating a private IP or Ethernet network by configuring a set of hardware and software resources (e.g. IP routers, DNS servers, DHCP servers, Ethernet switches, egress to internet, IMS servers, etc.).

Configuring a selected PDU Session Anchor (PSA) as the ingress point to the 5GLAN.

3.4 Creation/Deletion of a Group by Admin User

Figure 7:
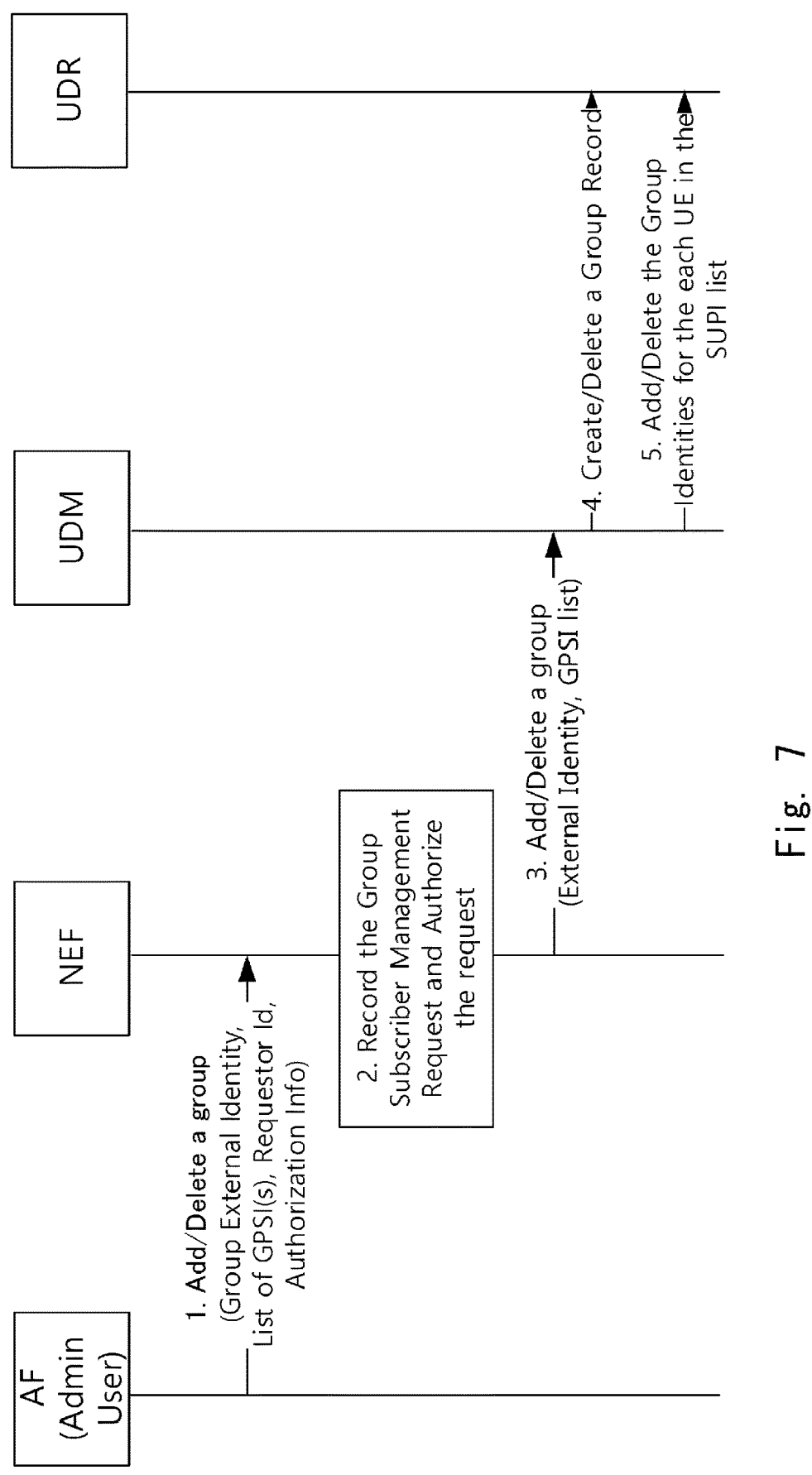
FIG. 7 illustrates a procedure for creation/deletion of a group by admin user.

FIG. 7 illustrates a procedure for creation/deletion of a group by admin user. The procedure involves the following steps:

1. The AF (i.e. the admin subscriber) requests the NEF to add (or delete) a group. It includes the Group External Identity, list of the GPSI(s), Requestor Identity, and Authorization Information.
2. The NEF may record its request so that the operator allow or authorize the request.
3. When the operator authorize the request, the NEF proceeds to use the UDM's service operations to request the UDM to create (or delete) a group with list of UE identities.
4. UDM uses the UDR service operations to create (or delete) a group from the Group Records
5. For each UEs in the group, UDM uses the UDR service operations to add (or delete) a Group identified by Internal/External Identifier.

4. Proposed Aspects 4.1 First Aspect (Solution 1 Solves Problem Statement 1):

The proposed solution discussed in 4.1 aspect shall ensure authenticity and access permissions for 5GLAN services for the genuine UE's provisioned in 5GLAN Group Communication.

The solution also addresses the gaps of security procedures for GMF, which was not discussed in TR 23.734 (NPL 3).

The proposed solution derives the $K_{GMF}$ for GMF in 5GLAN group communication, the keys which shall provide confidentiality, authenticity and integrity protection for 5GLAN UE's message transmission.

The proposed $K_{GMF}$ shall be used to introduce anonymity and privacy for 5GLAN UE's and 5GLAN services respectively.

The derivation of $K_{GMF}$ in GMF and UE's for 5GLAN communication shall be considered as novelty.

The security procedure which uses $K_{GMF}$ for protecting the message communication and access permission for UE's in 5GLAN group shall also be considered as novelty of the first aspect.

The $K_{GMF}$ shall be used for integrity and confidentiality protection of the sensitive information sent by the 5GLAN UE to the 5GLAN GMF via AMF. This solution shall be considered as one of the novelty point.

This section provides solutions for security gaps addressed and discussed in sub problem statement 1.

A. Security Procedures

A.1 Authentication Procedure of UE's in 5GLAN

Figure 8:
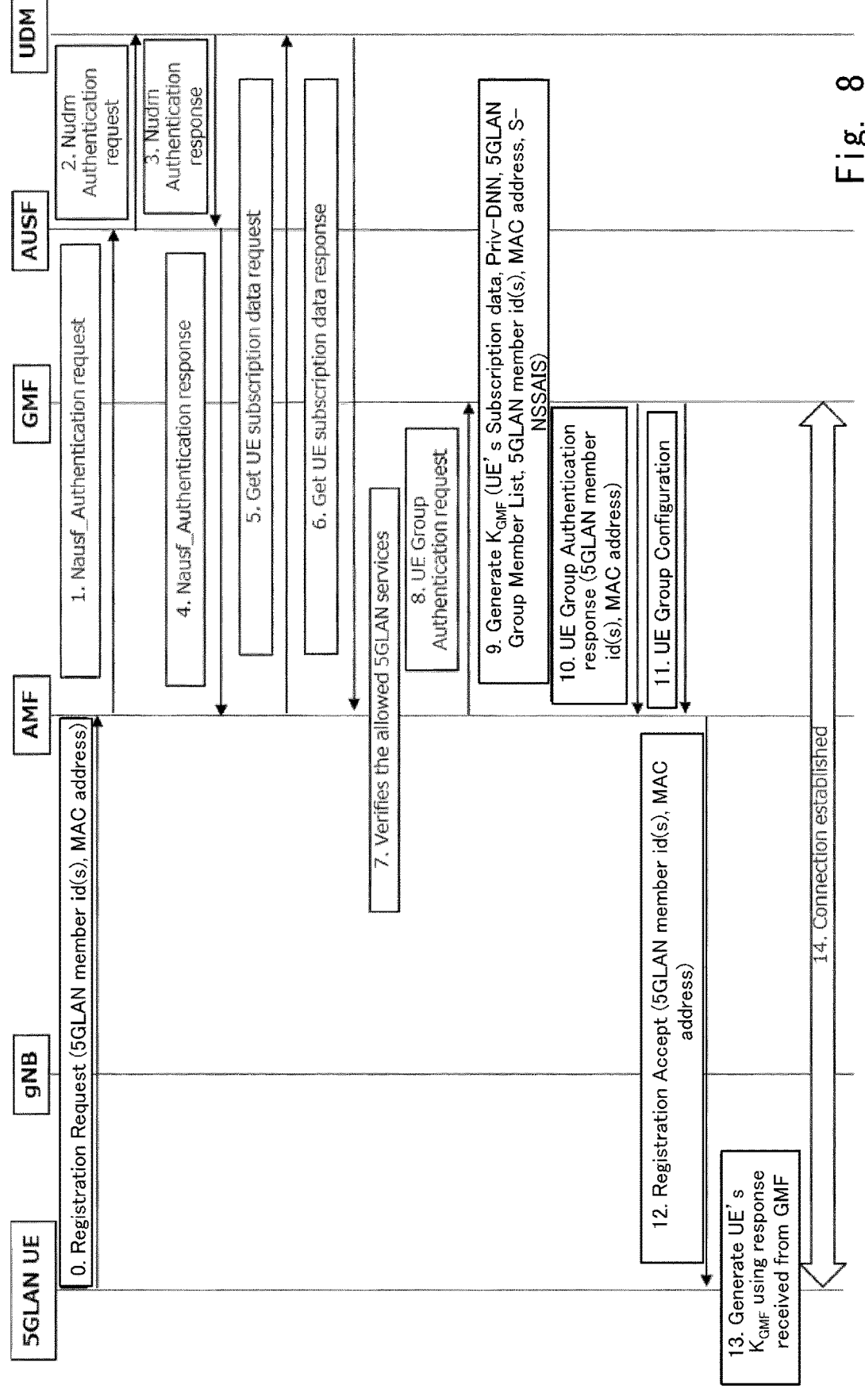
FIG. 8 illustrates an authentication procedure of UE's in 5GLAN Group Communication according to a first aspect.

FIG. 8 illustrates the Authentication procedure of UE's in 5GLAN Group Communication. The procedure involves the following steps:

0. The 5GLAN UE sends a registration request along with the 5GLAN member id(s), the MAC address.

1. The AMF sends a Nausf_Authentication request to the AUSF.

2. After receiving the Nausf_Authentication request the AUSF sends the Nudm_Authentication request to the UDM (Unified Data Management).

3. The UDM sends a Nudm_Authentication response to the AUSF.

4. On receiving the Nudm_Authentication response to authentication the AUSF sends the Nausf_authentication response to the AMF, and the authentication procedure takes place between UE and 5GC based on the procedure given in TS 33.501 (NPL 2) clause 6.1.2 and clause 6.1.3.

5. The AMF will then send a Get subscription data request to the UDM.

6. The UDM responds to the Get subscription data request and sends the 5GLAN UE related subscription data to the AMF in a Get subscription data response.

7. The AMF then checks the 5GLAN UE related subscription data and determines the allowed 5GLAN-type services to that particular 5GLAN UE.

8. After determining the allowed 5GLAN services AMF sends the UE group authentication request to the GMF.

9. At the GMF a key for Group Management Function $K_{GMF}$ is derived which shall be used to derive the $K_{GMFint}$ and $K_{GMFenc}$. These keys shall be used for integrity and confidentiality protection of the sensitive information sent by the 5GLAN UE to the 5GLAN GMF via the AMF.

10. The GMF sends a UE group authentication response to AMF.

11. In this response the GMF includes the 5GLAN member id(s), the MAC address and the UE group configuration. In example of FIG. 8, the GMF sends the UE group authentication response and the UE group configuration.

12. On receiving the UE group authentication response and UE group configuration the AMF sends a registration accept with the 5GLAN member id(s), the MAC address and the UE group configuration.

13. At the UE side the $K_{GMF}$ is derived which shall be used for deriving the $K_{GMFint}$ and the $K_{GMFenc}$.

14. After successful key derivation a connection is established between the UE and the 5GLAN group.

A.2 Authorization Procedure of UE's in 5GLAN

Figure 9:
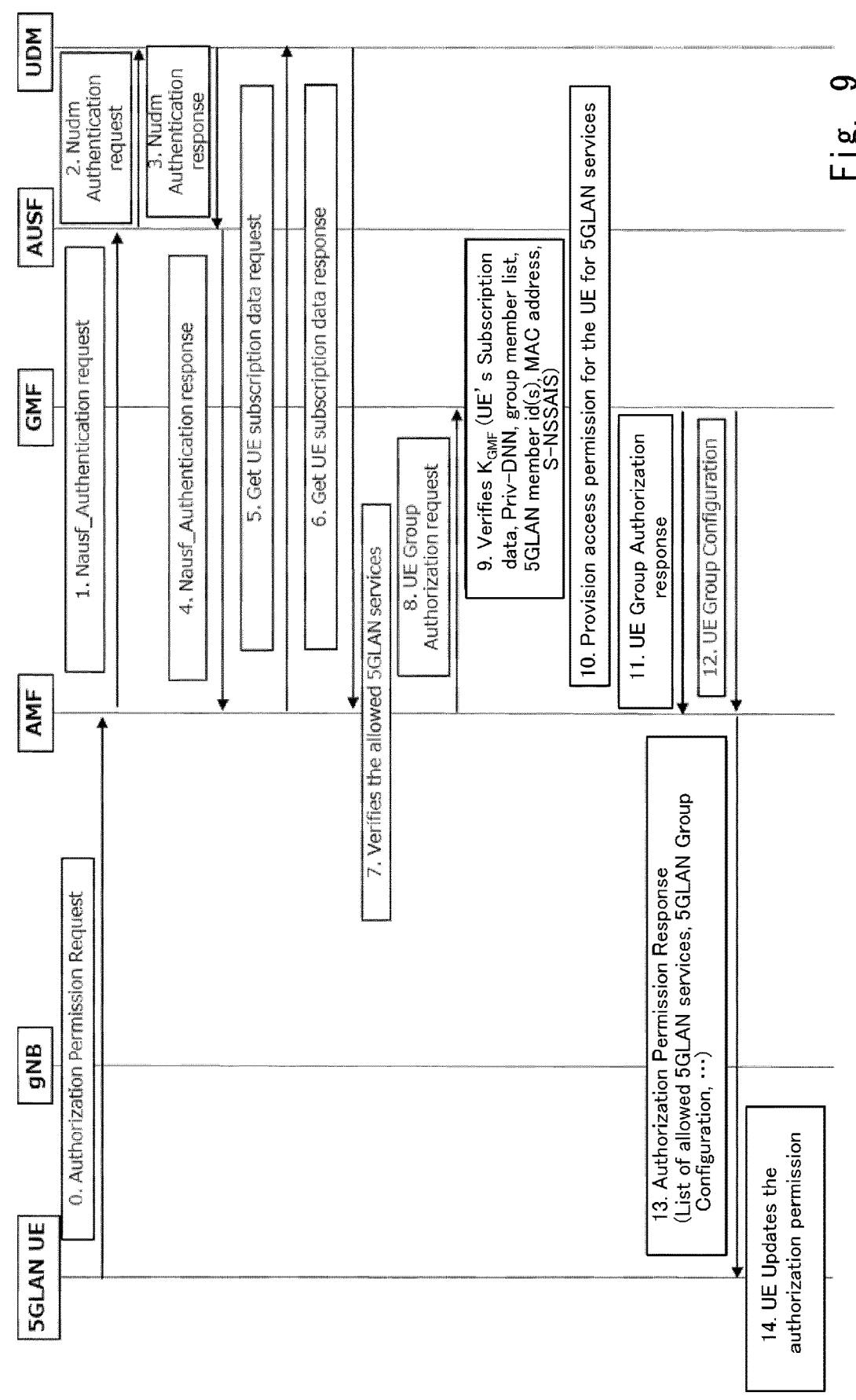
FIG. 9 illustrates an authorization procedure of UE's in 5GLAN Group Communication according to the first aspect.

FIG. 9 illustrates the Authorization procedure of UE's in 5GLAN Group Communication. The procedure involves the following steps:

0. The 5GLAN UE sends an authorization permission request along with the 5GLAN member id(s), the MAC address.

1. The AMF sends a Nausf_Authentication request to the AUSF.

2. After receiving the Nausf_Authentication request the AUSF sends the Nudm_Authentication request to the UDM.

3. The UDM sends a Nudm_Authentication response to the AUSF.

4. On receiving the Nudm_Authentication response to authentication the AUSF sends the Nausf_authentication response to the AMF, and the authentication procedure takes place between UE and 5GC based on the procedure given in TS 33.501 (NPL 2) clause 6.1.2 and clause 6.1.3.

5. The AMF will then send a Get subscription data request to the UDM.

6. The UDM responds to the Get subscription data request and sends the 5GLAN UE related subscription data to the AMF in a Get subscription data response.

7. The AMF then checks the 5GLAN UE related subscription data and determines the allowed 5GLAN-type services to that particular 5GLAN UE.

8. After determining the allowed 5GLAN services AMF sends a UE group authorization request to the GMF.

9. The GMF verifies the $K_{GMF}$.

10. The GMF provisions the access permissions for the UE in 5GLAN group for 5GLAN-type services.

11-12. The GMF sends a UE group authorization response to the AMF along with a UE group configuration.

13. The AMF sends an authorization permission response to the UE with the list of allowed 5GLAN-type services.

14. The UE then gets updated the authorization permission with the allowed 5GLAN-type services.

Figure 10:
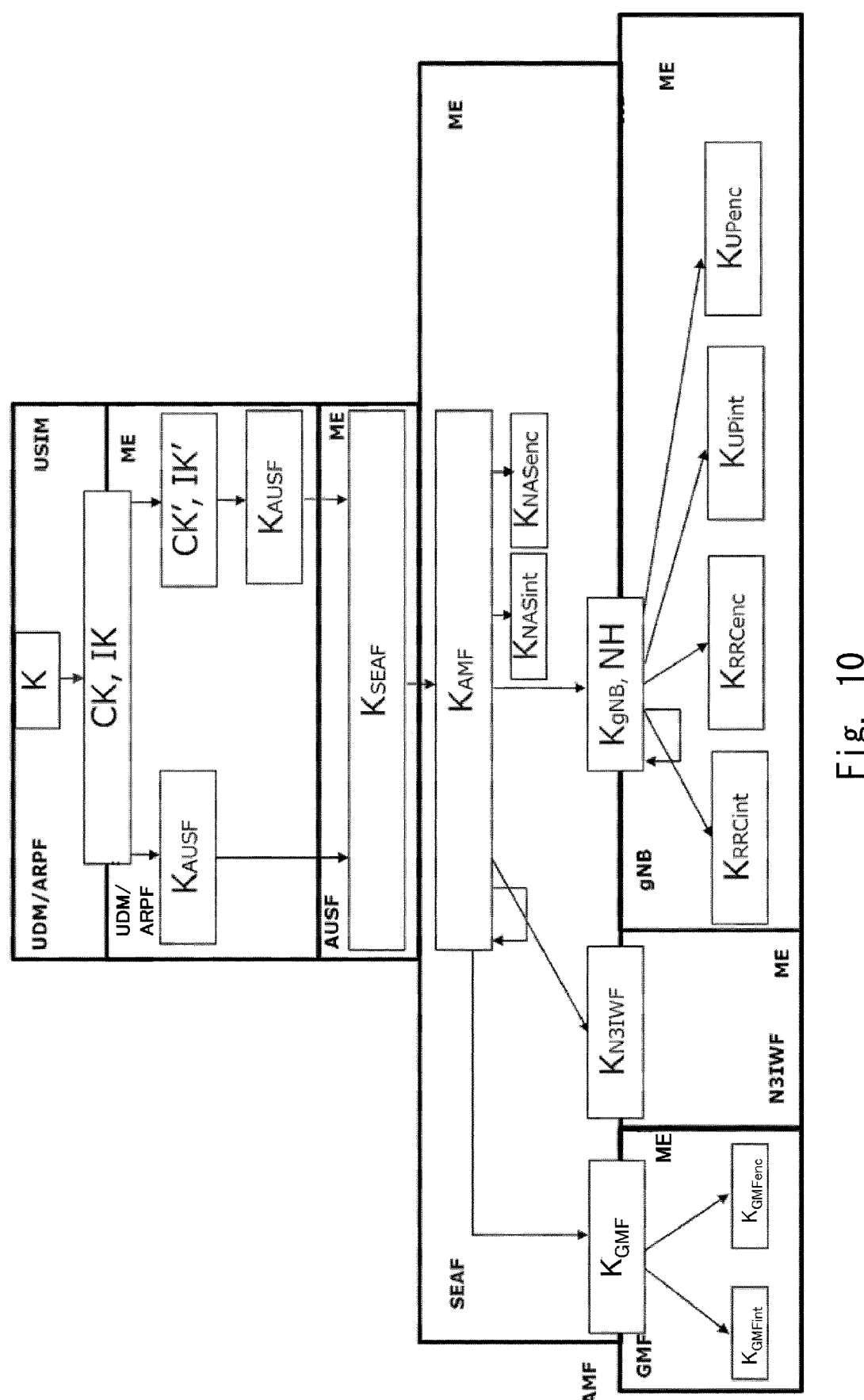
FIG. 10 illustrates a flow of a proposed key derivation according to the first aspect.

A.2.1 Proposed Key Derivation:

FIG. 10 illustrates a flow of a proposed key derivation. As shown, the $K_{GMF}$ is used to derive the $K_{GMFint}$ and $K_{GMFenc}$.

4.2 Second Aspect (Solution 2 Solves Problem Statement 2):

The proposed solution discussed in 4.2 aspect may mitigate the impersonation attacks/DDoS attacks in 5GLAN Group by 5GLAN UE's due to the handling of 5GLAN UE's related security context by GMF during Idle/Inactive/Failure/Subscription expiry.

The proposed solution discuss about the security procedures by GMF for 5GLAN UE's during different transition states in 5GLAN group communication which was not discussed in TR 23.734 (NPL 3).

The proposed solution discuss the security procedure of detachment of UE's state in 5GLAN group communication by GMF was also not discussed in TR 23.734 (NPL 3).

The proposed solution provides the status of 5GLAN UE's during different transition state to GMF, based on the transition state of 5GLAN UE's GMF shall protect the security context of each 5GLAN UE in 5GLAN group.

The proposed solution shall notify the transition state of 5GLAN UE's to GMF and notification shall be authenticity/integrity protected.

The proposed solution shall provide status of UE's Subscription expiry to GMF, and that shall protect the 5GLAN services from unauthorised access of expired UE's in 5GLAN group network. This was discussed in TR 23.734 (NPL 3).

The above solution description that discuss about status of transition state of each UE's in 5GLAN group to GMF, based on status GMF provide access permission and protecting the security context of 5GLAN UE's shall be considered to be novelty of the second aspect.

Handling of 5GLAN UE security context during state transition

During state transition i.e., from Idle to connected/Inactive to connected, the 5GLAN UE related security context is retrieved by the AMF from GMF.

During connected to Idle/connected to inactive/subscription expiry/failure scenario, the 5GLAN UE related security context is removed from the GMF after receiving the UE status information from AMF.

A. Attachment Scenario

A.1. Transition from Idle to Connected State

Figure 11:
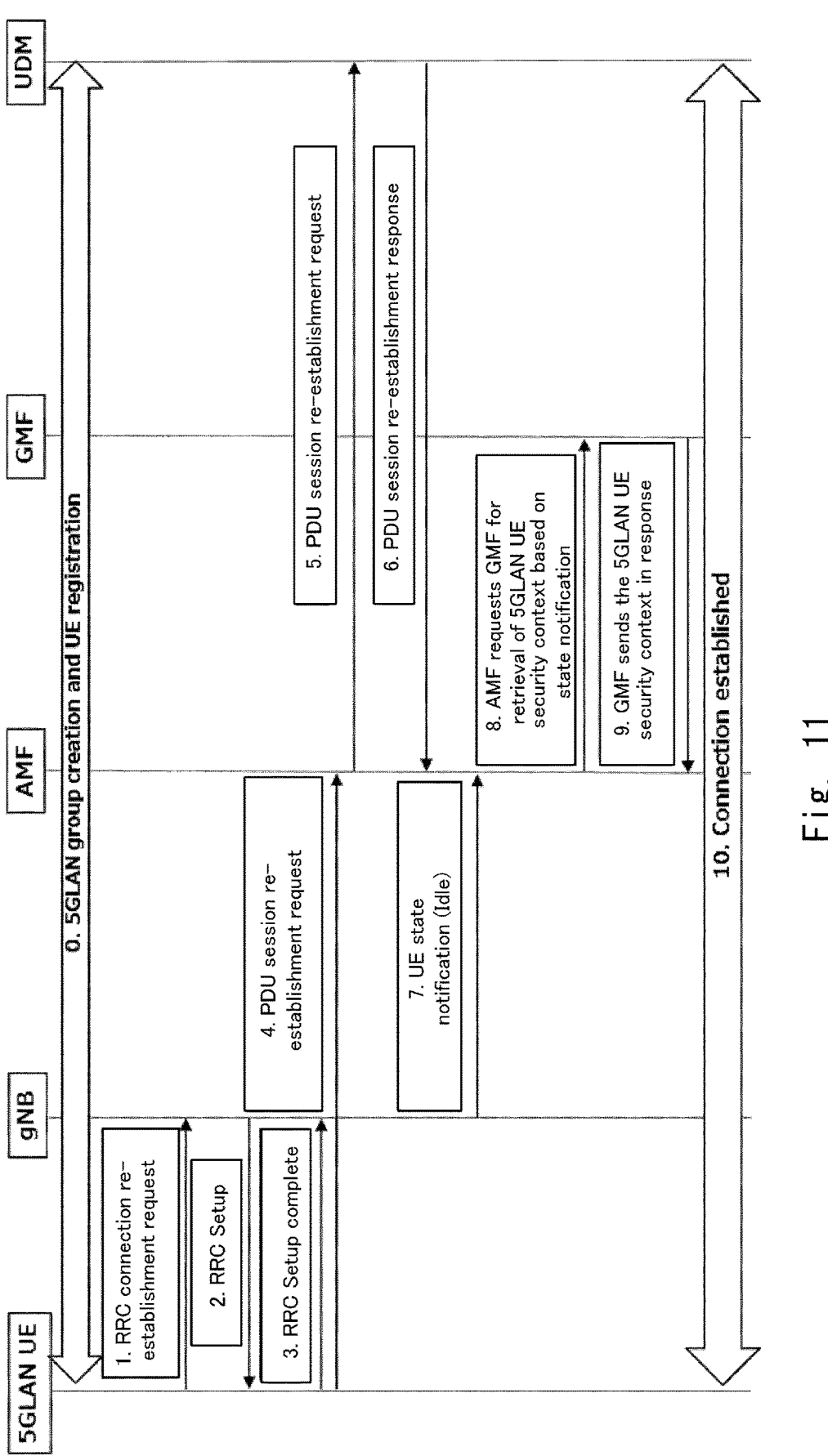
FIG. 11 illustrates an attachment scenario during state transition from Idle to connected state according to a second aspect.

FIG. 11 illustrates the procedure for handling of 5GLAN UE security context by GMF in 5GLAN Group Communication during state transition of UE's from Idle to connected state. The procedure involves the following steps:

0. The 5GLAN Group is created and members are added to the 5GLAN group according to the procedure defined in TR 23.734 (NPL 3), clause 6.14.2.1.

The 5GLAN UE initiates the registration request to the AMF and then the AMF authenticates the 5GLAN UE to the network.

0 a. The AMF sends the group authentication request to the GMF.

0 b. After successful Group Authentication the 5GLAN UE registers itself to the 5GLAN group.

1. On state transition from RRC Idle to RRC connected state the UE sends an RRC connection re-establishment request to the gNB (NR NodeB, NR base station).

2. The gNB responds to the UE with an RRC setup on receiving the RRC connection re-establishment request.

3. The 5GLAN UE sends an RRC setup complete to the gNB on reception of the RRC setup from the gNB.

4-5. The 5GLAN UE sends a PDU session re-establishment request to the AMF. The AMF then forwards the PDU session re-establishment request to the UDM.

6. On receiving the PDU session re-establishment request, the UDM sends a PDU session re-establishment response to the AMF.

7. The gNB sends a UE state notification (Idle) to the AMF in order to notify the state of the 5GLAN UE.

8. On reception of UE state notification the AMF requests the GMF to retrieve the 5GLAN UE security context based on UE's state.

9-10. The GMF sends the 5GLAN UE security context to the AMF in the response and connection is established.

A.2. Transition from Inactive to Connected State

Figure 12:
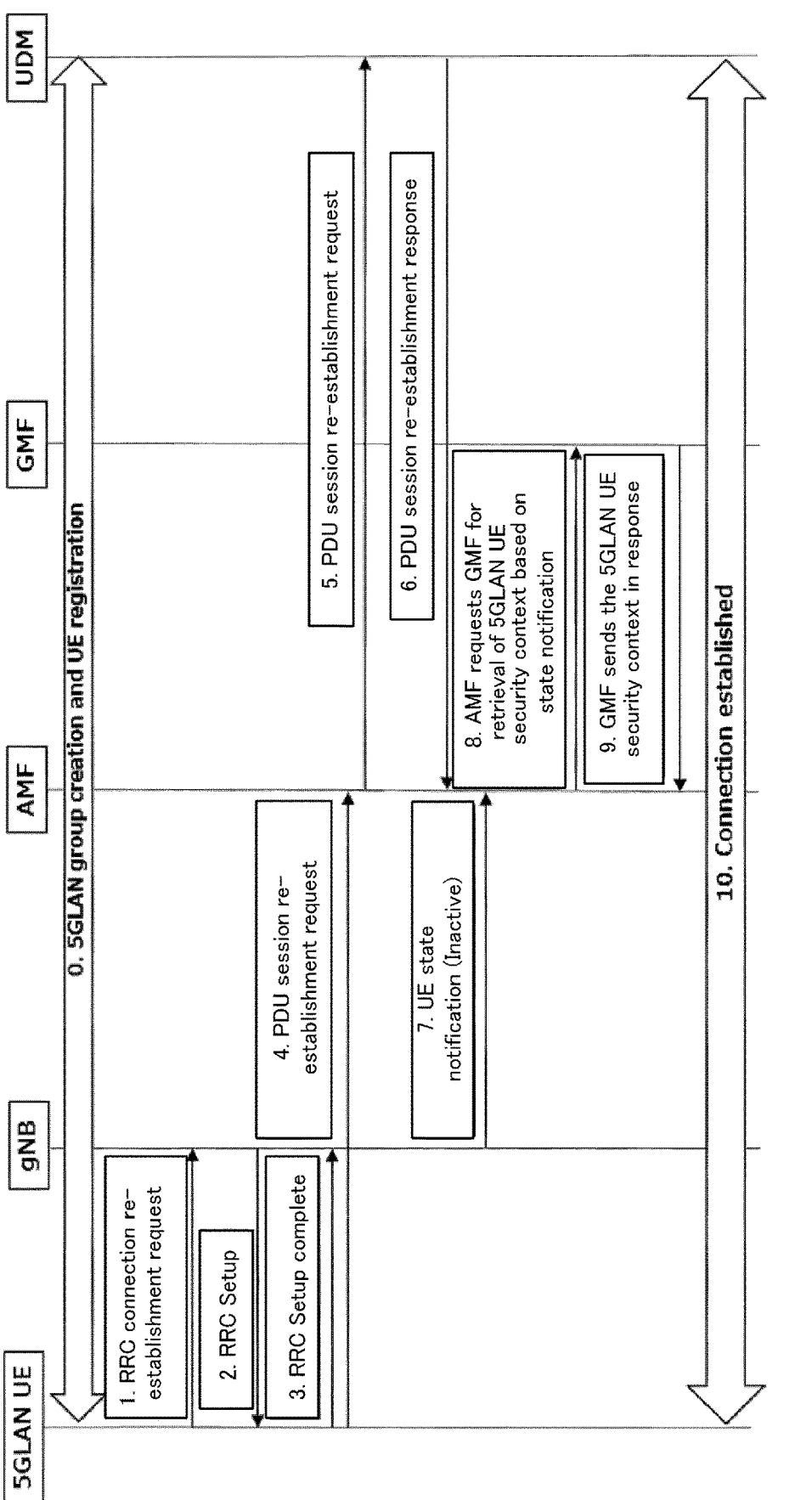
FIG. 12 illustrates an attachment scenario during state transition from Inactive to connected state according to the second aspect.

FIG. 12 illustrates the procedure for handling of 5GLAN UE security context by GMF in 5GLAN Group Communication during state transition of UE's from Inactive to connected state. The procedure involves the following steps:

0. The 5GLAN Group is created and members are added to the 5GLAN group according to the procedure defined in TR 23.734 (NPL 3), clause 6.14.2.1.

The 5GLAN UE initiates the registration request to the AMF and then AMF authenticates the 5GLAN UE to the network.

0 a. The AMF sends the group authentication request to the GMF.

0 b. After successful Group Authentication the 5GLAN UE registers itself to the 5GLAN group.

1. On state transition from RRC inactive to RRC connected state UE sends an RRC connection re-establishment request to the gNB.

2. The gNB responds to the UE with an RRC setup on receiving the RRC connection re-establishment request.

3. The 5GLAN UE sends an RRC setup complete to the gNB on reception of the RRC setup from the gNB.

4-5. The 5GLAN UE sends a PDU session re-establishment request to the AMF. The AMF then forwards the PDU session re-establishment request to the UDM.

6. On receiving the PDU session re-establishment request, UDM sends a PDU session re-establishment response to the AMF.

7. The gNB sends a UE state notification (Inactive) to the AMF in order to notify the state of the 5GLAN UE.

8. On reception of UE state notification the AMF requests the GMF to retrieve the 5GLAN UE security context based on UE's state.

9-10. The GMF sends the 5GLAN UE security context to the AMF in the response and the connection is established.

A.3. Authentication Failure Scenario

Figure 13:
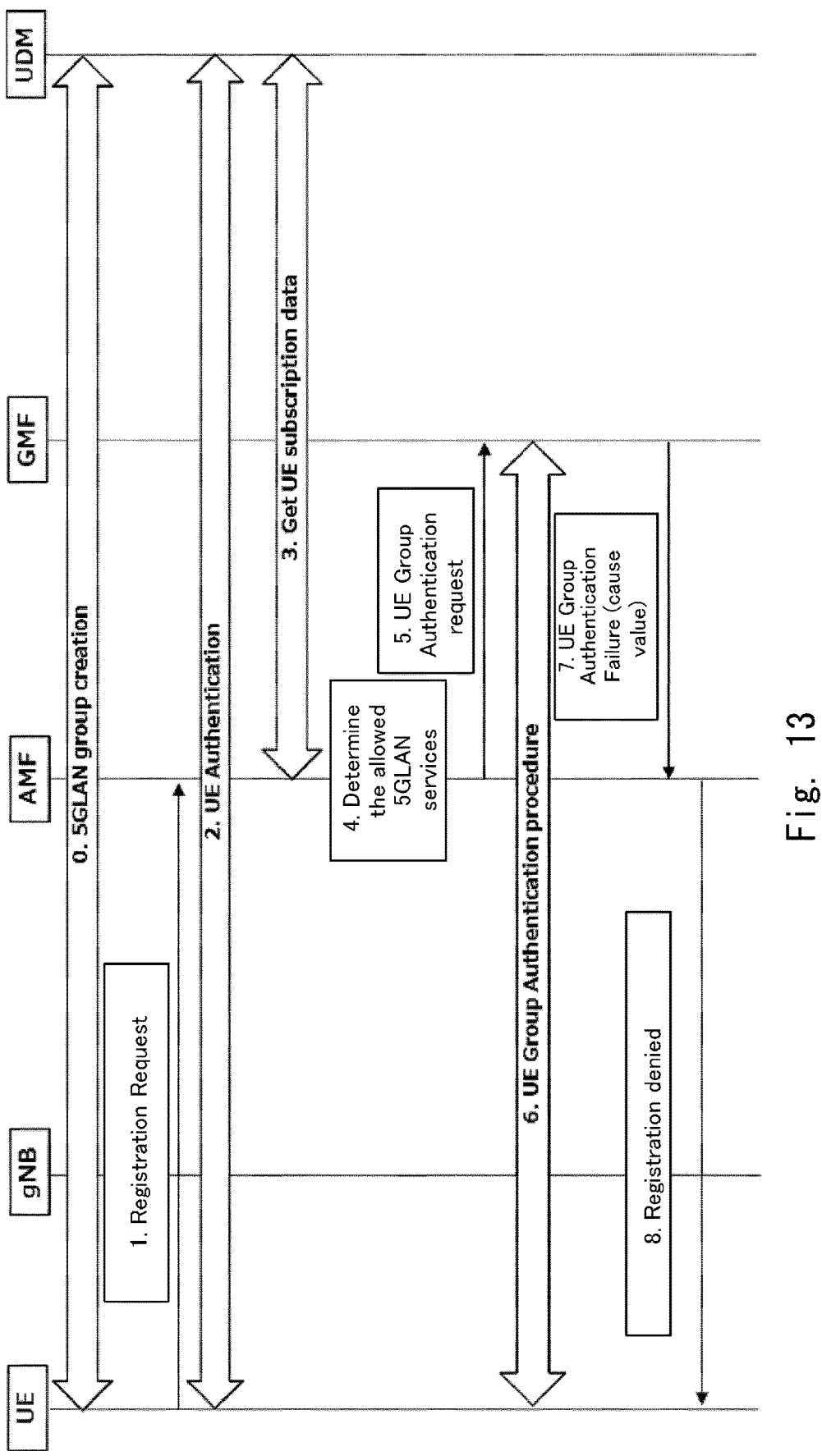
FIG. 13 illustrates an authentication failure scenario according to the second aspect.

FIG. 13 illustrates the procedure for handling of 5GLAN UE security context by GMF in 5GLAN Group Communication when there is Group authentication failure. The procedure involves the following steps:

0. The 5GLAN Group is created and members are added to the 5GLAN group according to the procedure defined in TR 23.734 (NPL 3), clause 6.14.2.1.

1. The 5GLAN UE initiates a registration request to the AMF and then the AMF authenticates the 5GLAN UE to the network.

2-3. The UE Authentication takes place between the UE and the 5GC. The AMF gets the UE subscription data from the UDM.

4. The AMF determines the 5GLAN-type services which are allowed for the authenticated 5GLAN UE.

5. The AMF then sends a UE group authentication request to the GMF for authenticating the 5GLAN UE for group communication.

6-7. The UE group authentication procedure takes place between the 5GLAN UE and the GMF in the 5GLAN Group. On Group authentication failure a UE group authentication failure response is sent by the GMF to the AMF with the cause value.

8. The AMF sends a registration denied to the UE via gNB as a response for the group authentication failure.

B. Detachment Scenario:

B.1 Transition from Connected to Idle State

Figure 14:
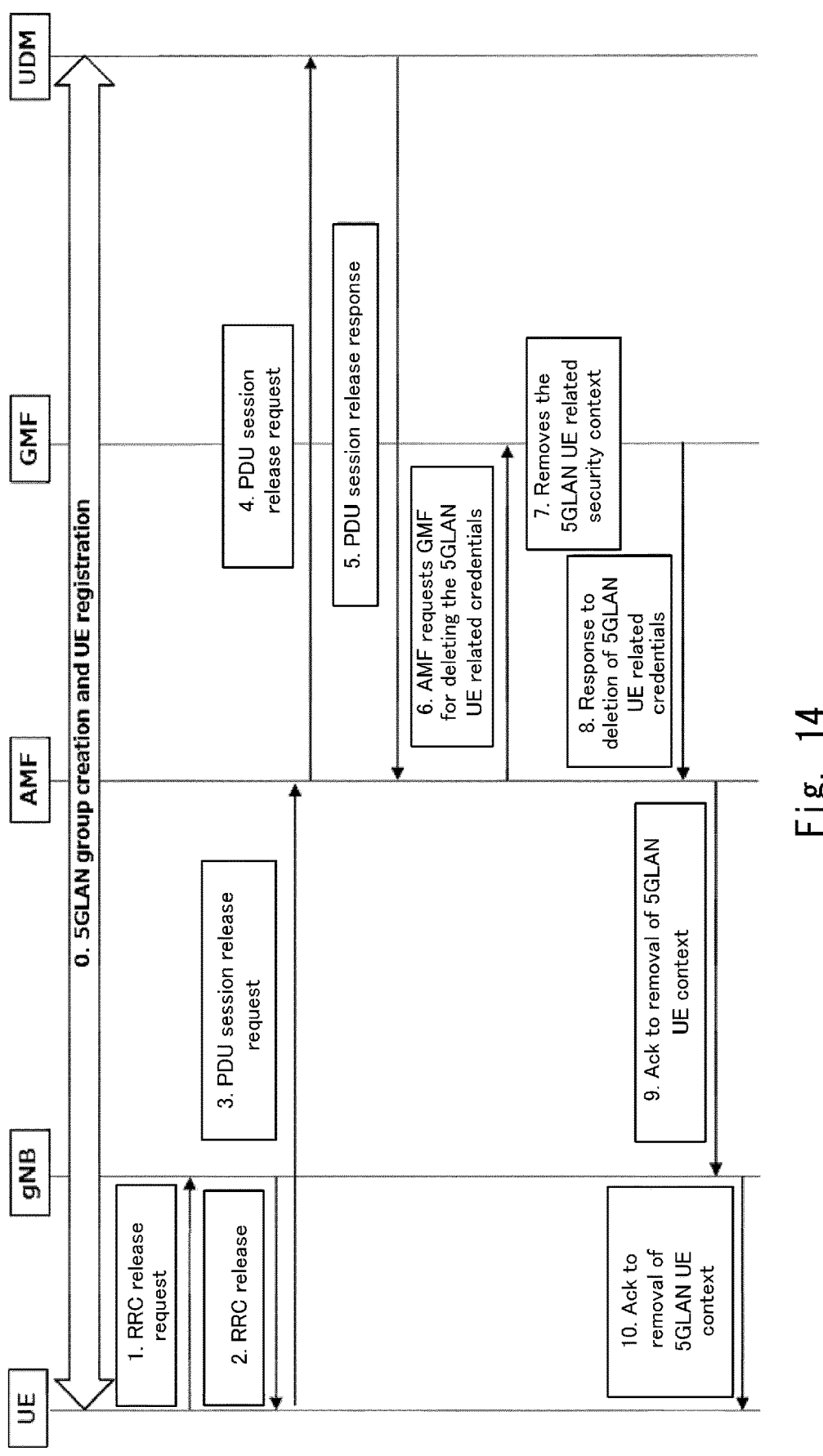
FIG. 14 illustrates a detachment scenario during state transition from connected to idle state according to the second aspect.

FIG. 14 illustrates the procedure for handling of 5GLAN UE security context by GMF in 5GLAN Group Communication during state transition of UE's from connected to idle state. The procedure involves the following steps:

0. The 5GLAN Group is created and members are added to the 5GLAN group according to the procedure defined in TR 23.734 (NPL 3), clause 6.14.2.1.

The 5GLAN UE initiates the registration request to the AMF and then the AMF authenticates the 5GLAN UE to the network.

0 a. The AMF sends the group authentication request to the GMF.

0 b. After successful Group Authentication the 5GLAN UE registers itself to the 5GLAN group.

1. On state transition from connected to idle state an RRC release request is initiated by the 5GLAN UE and the UE sends the request to the gNB.

2. The gNB sends an RRC release as a response to the RRC release request sent by the 5GLAN UE.

3. On reception of the RRC release response the UE initiates a PDU session release request and sends the request to the AMF.

4. The AMF then forwards the PDU session release request to the UDM via the SMF.

5. The UDM sends a PDU session release response as response to the PDU session release request to the AMF.

6. On reception of the PDU session release response the AMF requests the GMF to remove the 5GLAN UE related security context (the 5GLAN UE related credentials).

7-8. On receiving the request for removing the 5GLAN UE related security context, the GMF removes the 5GLAN UE related security context and sends a response to the request for removing the 5GLAN UE related security context to the AMF.

9-10. The AMF sends the acknowledgement to removal of the 5GLAN UE security context to the UE via the gNB.

B.2. Transition from Connected to Inactive State

Figure 15:
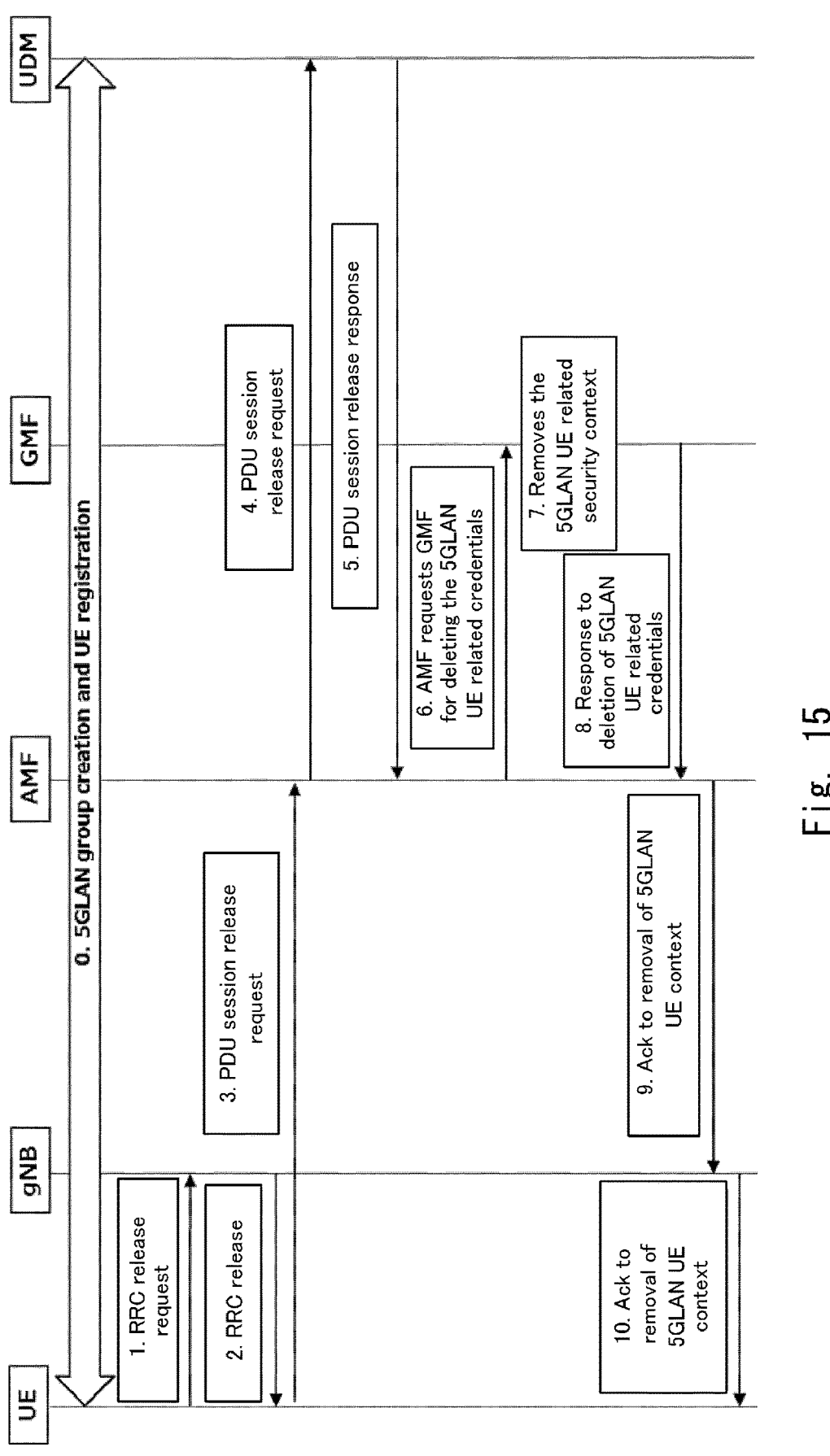
FIG. 15 illustrates a detachment scenario during state transition from connected to inactive state according to the second aspect.

FIG. 15 illustrates the procedure for handling of 5GLAN UE security context by GMF in 5GLAN Group Communication during state transition of UE's from connected to inactive state. The procedure involves the following steps:

0. The 5GLAN Group is created and members are added to the 5GLAN group according to the procedure defined in TR 23.734 (NPL 3), clause 6.14.2.1.

The 5GLAN UE initiates the registration request to the AMF and then the AMF authenticates the 5GLAN UE to the network.

0 a. the AMF sends the group authentication request to the GMF.

0 b. After successful Group Authentication the 5GLAN UE registers itself to the 5GLAN group.

1. On state transition from connected to inactive state an RRC release request is initiated by the 5GLAN UE and the UE sends the request to the gNB.

2. The gNB sends an RRC release as a response to the RRC release request sent by the 5GLAN UE.

3. On reception of the RRC release response the UE initiates a PDU session release request and sends the request to the AMF.

4. The AMF then forwards the PDU session release request to the UDM via the SMF.

5. The UDM sends a PDU session release response as response to the PDU session release request to the AMF.

6. On reception of the PDU session release response the AMF requests the GMF to remove the 5GLAN UE related security context (the 5GLAN UE related credentials).

7-8. On receiving the request for removing the 5GLAN UE related security context, the GMF removes the 5GLAN UE related security context and sends a response to the request for removing the 5GLAN UE related security context to the AMF.

9-10. The AMF sends the acknowledgement to removal of the 5GLAN UE security context to the UE via the gNB.

B.3. Failure Scenario

Figure 16:
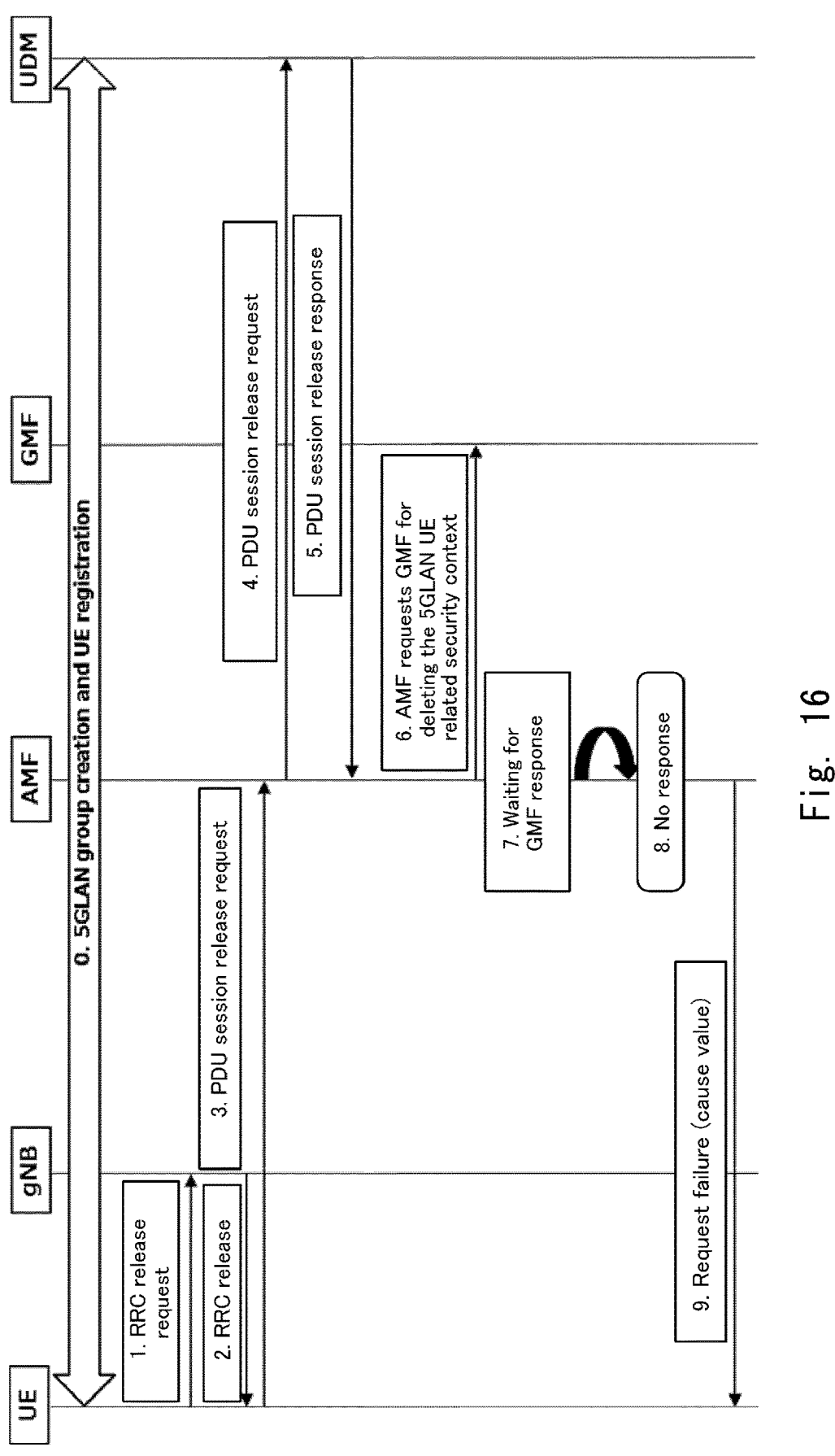
FIG. 16 illustrates a network failure scenario according to the second aspect.

FIG. 16 illustrates the procedure for handling of 5GLAN UE security context by GMF in 5GLAN Group Communication when there is network failure. The procedure involves the following steps:

0. The 5GLAN Group was created and members were added to the 5GLAN group according to the procedure defined in TR 23.734 (NPL 3), clause 6.14.2.1.

The 5GLAN UE initiates the registration request to the AMF and then the AMF authenticates the 5GLAN UE to the network.

0 a. The AMF sends the group authentication request to the GMF.

0 b. After successful Group Authentication the 5GLAN UE registers itself to the 5GLAN group.

1. On state transition an RRC release request is initiated by the 5GLAN UE and the UE sends the request to the gNB.

2. The gNB sends an RRC release as a response to the RRC release request sent by the 5GLAN UE.

3. On reception of the RRC release response the UE initiates a PDU session release request and sends the request to the AMF.

4. The AMF then forwards the PDU session release request to the UDM via the SMF.

5. The UDM sends a PDU session release response as response to the PDU session release request to the AMF.

6. On reception of the PDU session release response the AMF requests the GMF to remove the 5GLAN UE related security context.

7. The AMF waits for a response of the GMF for a particular instance of time.

8-9. When the AMF does not receives any response it sends back a request failure response to the UE with the cause value.

B.4. Subscription Expiry (Only During Detachment Scenario)

Figure 17:
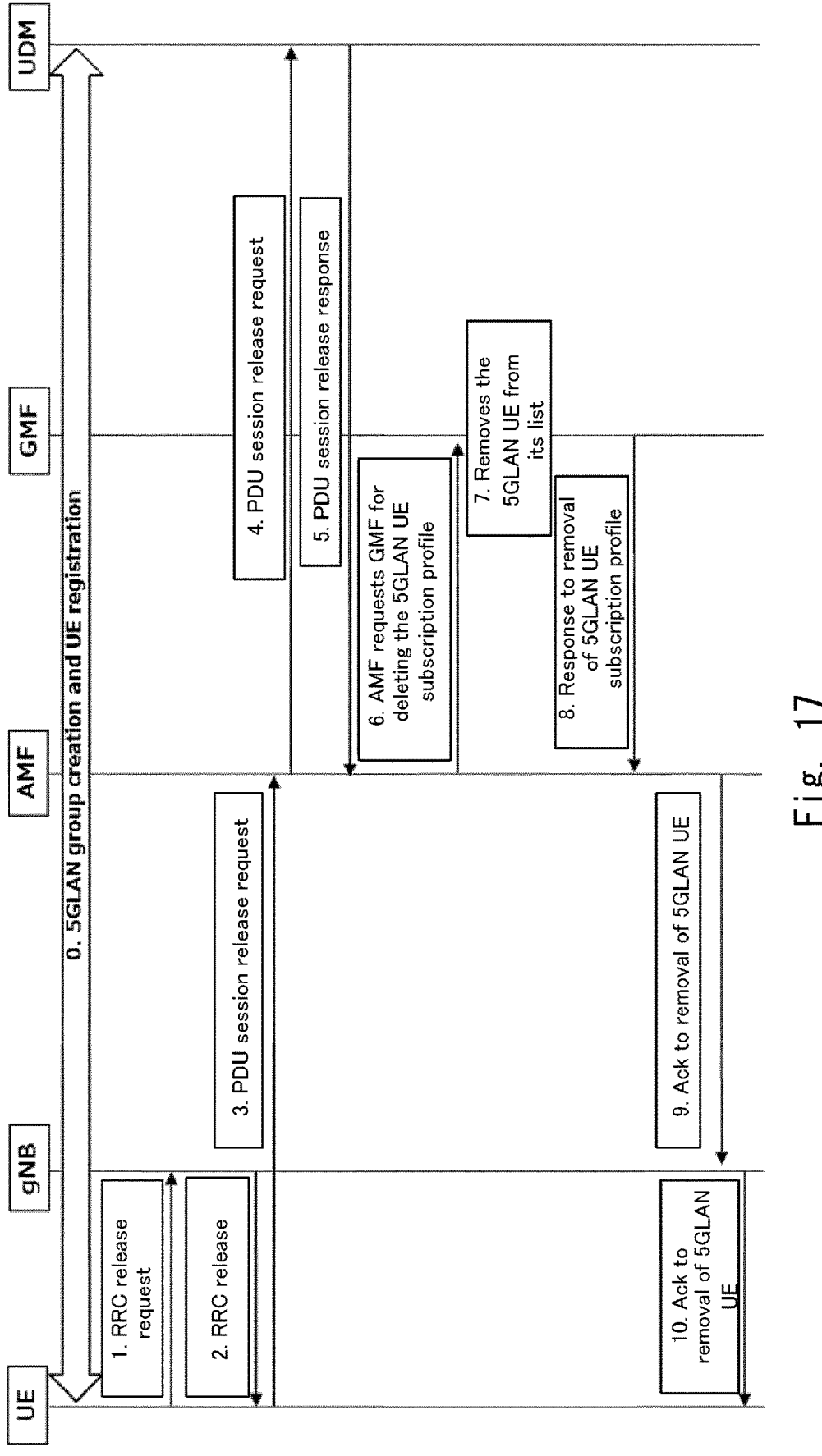
FIG. 17 illustrates a scenario when there is subscription expiry (only during detachment scenario) according to the second aspect.

FIG. 17 illustrates the procedure for handling of 5GLAN UE security context by GMF in 5GLAN Group Communication when there is subscription expiry (only during detachment scenario). The procedure involves the following steps:

0. The 5GLAN Group is created and members are added to the 5GLAN group according to the procedure defined in TR 23.734 (NPL 3), clause 6.14.2.1.

The 5GLAN UE initiates the registration request to the AMF and then the AMF authenticates the 5GLAN UE to the network.

0 a. The AMF sends the group authentication request to the GMF.

0 b. After successful Group Authentication the 5GLAN UE registers itself to the 5GLAN group.

1. On subscription expiry an RRC release request is initiated by the 5GLAN UE and the UE sends the request to the gNB.

2. The gNB sends an RRC release as a response to the RRC release request sent by the 5GLAN UE.

3. On reception of the RRC release response the UE initiates a PDU session release request and sends the request to the AMF.

4. The AMF then forwards the PDU session release request to the UDM via the SMF.

5. The UDM sends a PDU session release response as response to the PDU session release request to the AMF.

6. On reception of the PDU session release response the AMF requests the GMF to remove the stored UE subscription profile.

7. On reception of the request for removing the UE subscription profile, the GMF removes the UE from the 5GLAN group member list.

8. The GMF then sends the UE subscription profile removal response to the AMF.

9. Acknowledgement to removal of the UE subscription profile as well as the UE from the 5GLAN group member list is sent back to the UE by the AMF via the gNB.

4.3 Third Aspect (Solution 3 Solves Problem Statement 3):

The proposed solution discussed in 4.3 aspect may mitigate the data theft attacks/privacy attacks in 5GLAN Group by 5GLAN UE's due to the handling of access permission by GMF, since GMF provision's 5GLAN service to the UE based on its transition states (such as Idle/Inactive).

The proposed solution discuss about the access restrictions by GMF for 5GLAN UE's during different transition states in 5GLAN group communication which was not discussed in TR 23.734 (NPL 3).

The proposed solution shall restricts the 5GLAN UE's to access different 5GLAN services in 5GLAN group communication based on their different transition states which was not discussed in TR 23.734 (NPL 3).

The above solution description in context of 5GLAN UE's and 5GLAN service type in 5GLAN group communication shall be considered to be novelty of the third aspect.

Handling of Access Restrictions by GMF

Figure 18:
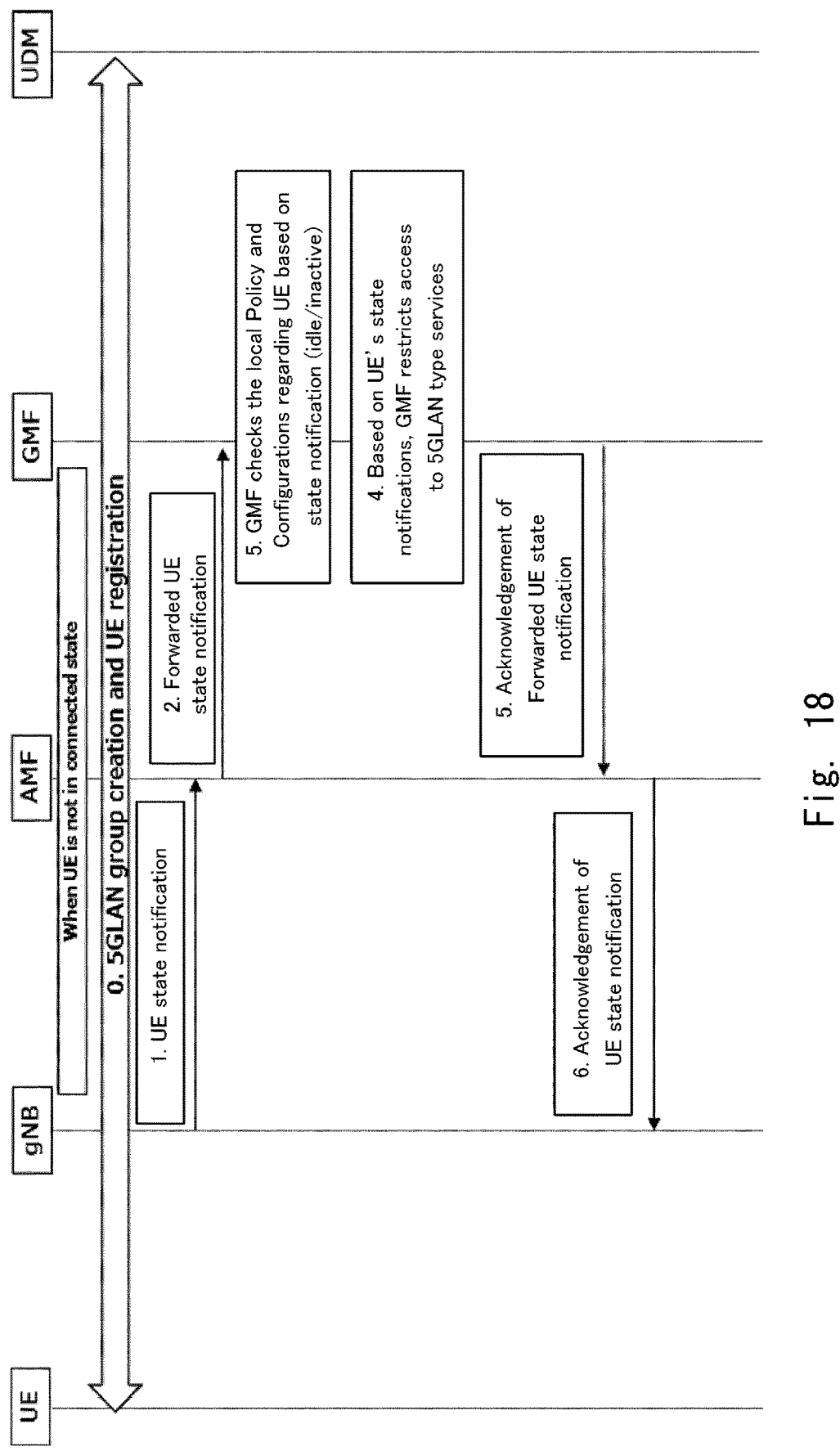
FIG. 18 illustrates a handling of access restrictions by GMF according to a third aspect.

FIG. 18 illustrates is the procedure for handling of access restrictions by GMF in 5GLAN Group based on state transition.

Considering the scenario when 5GLAN UE is not in connected state (i.e., Idle/Inactive state), steps are as follows:

0. The 5GLAN Group is created and members are added to the 5GLAN group according to the procedure defined in TR 23.734 (NPL 3), clause 6.14.2.1.

The 5GLAN UE initiates the registration request to the AMF and then the AMF authenticates the 5GLAN UE to the network.

0 a. the AMF sends the group authentication request to the GMF.

0 b. After successful Group Authentication the 5GLAN UE registers itself to the 5GLAN group.

1. The gNB sends a UE state Notification message to the AMF to report the current RRC state for the UE (i.e. RRC Inactive state or RRC Idle state, RRC Connected state).

2. The AMF forwards this UE state notification to the GMF.

3. According to the pre-provisioned access restrictions, the GMF checks the local policy (and configurations regarding UE) based on the UE state notification.

4. Based on the UE's state, the GMF restricts the access to 5GLAN-type services to the 5GLAN UE.

5. The GMF sends the acknowledgement of the forwarded UE state notification in order to notify the AMF about the restricted 5GLAN-type services for that particular UE.

6. The AMF then forwards this acknowledgement to the gNB to notify the 5GLAN UE about the restricted 5GLAN-type services.

4.4 Another Aspect:

User Equipment (UE)

Figure 19:
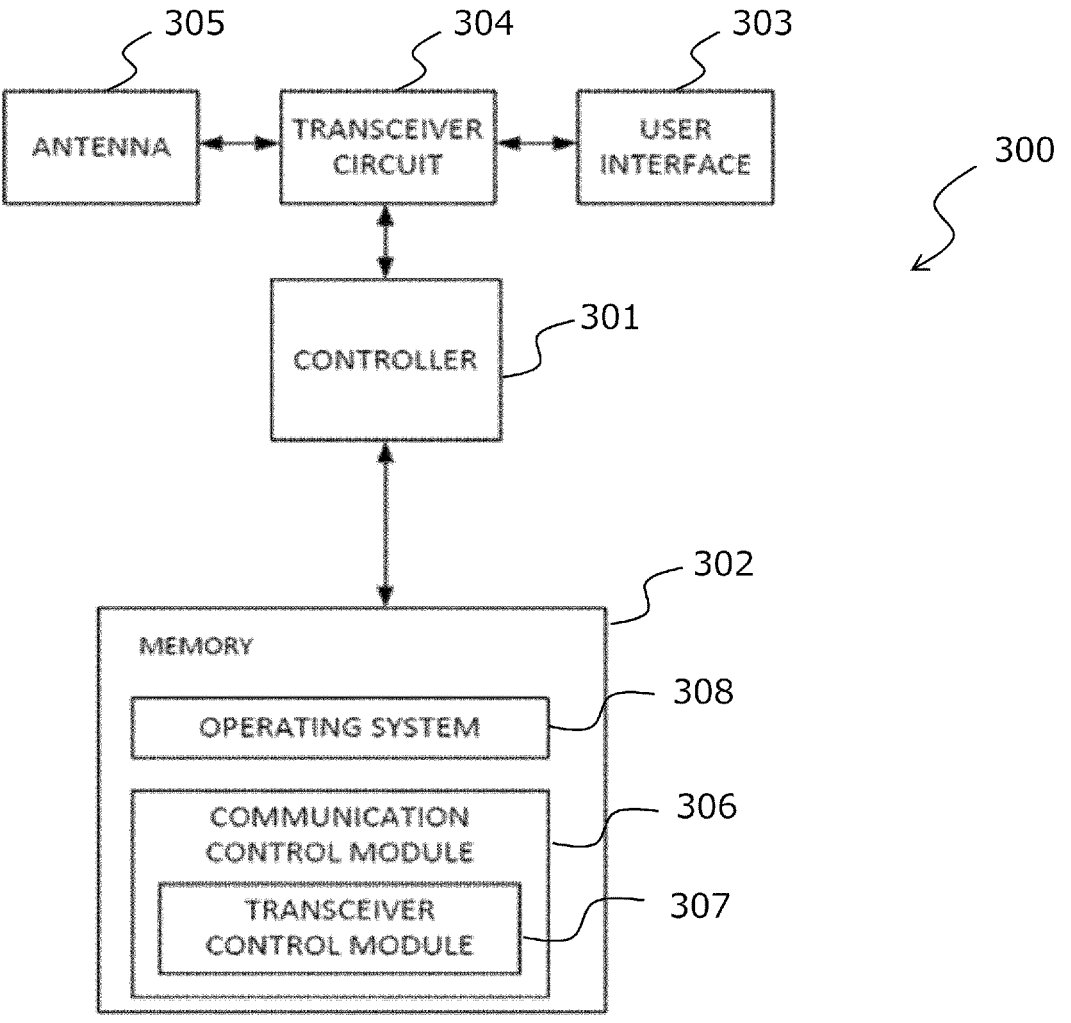
FIG. 19 illustrates a general block diagram for UE.

FIG. 19 is a block diagram illustrating the main components of the UE 300. As shown, the UE 300 includes a transceiver circuit 304 which is operable to transmit signals to and to receive signals from the connected node(s) via one or more antenna 305. Although not necessarily shown in FIG. 19, the UE 300 will of course have all the usual functionality of a conventional mobile device (such as a user interface 303) and this may be provided by any one or any combination of hardware, software and firmware, as appropriate. Software may be pre-installed in the memory 302 and/or may be downloaded via the telecommunication network or from a removable data storage device (RMD), for example.

A controller 301 controls the operation of the UE 300 in accordance with software stored in a memory 302. For example, the controller 301 may be realized by Central Processing Unit (CPU). The software includes, among other things, an operating system 308 and a communications control module 306 having at least a transceiver control module 307. The communications control module 306 (using its transceiver control sub-module) is responsible for handling (generating/sending/receiving) signalling and uplink/downlink data packets between the UE 300 and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

(R)AN Node

Figure 20:
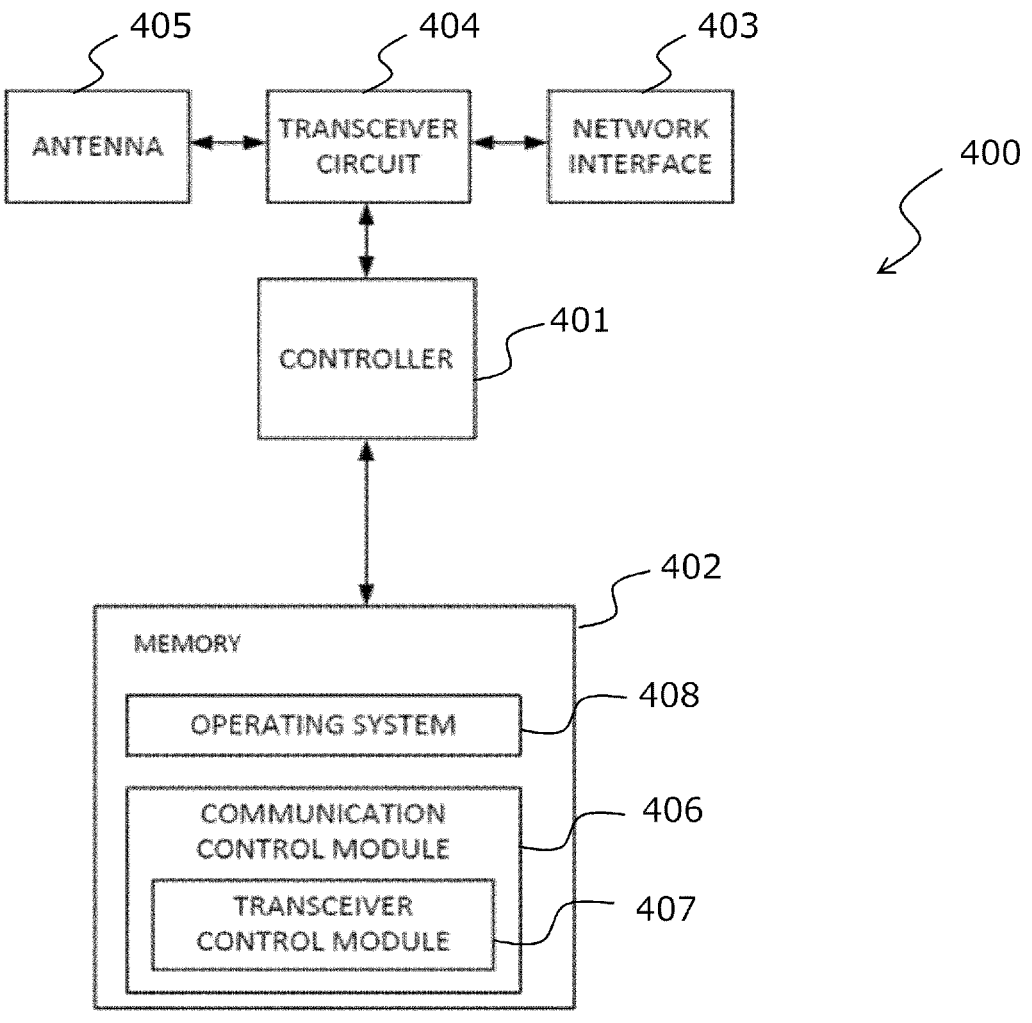
FIG. 20 illustrates a general block diagram for (R)AN.

FIG. 20 is a block diagram illustrating the main components of an exemplary (R)AN node 400, for example a base station ('eNB' in LTE, 'gNB' in 5G). As shown, the (R)AN node 400 includes a transceiver circuit 404 which is operable to transmit signals to and to receive signals from connected UE(s) via one or more antenna 405 and to transmit signals to and to receive signals from other network nodes (either directly or indirectly) via a network interface 403. A controller 401 controls the operation of the (R)AN node 400 in accordance with software stored in a memory 402. For example, the controller 401 may be realized by Central Processing Unit (CPU). Software may be pre-installed in the memory 402 and/or may be downloaded via the telecommunication network or from a removable data storage device (RMD), for example. The software includes, among other things, an operating system 408 and a communications control module 406 having at least a transceiver control module 407.

The communications control module 406 (using its transceiver control sub-module) is responsible for handling (generating/sending/receiving) signalling between the (R)AN node 400 and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case.

The controller 401 is also configured (by software or hardware) to handle related tasks such as, when implemented, UE mobility estimate and/or moving trajectory estimation.

Core Network Node

Figure 21:
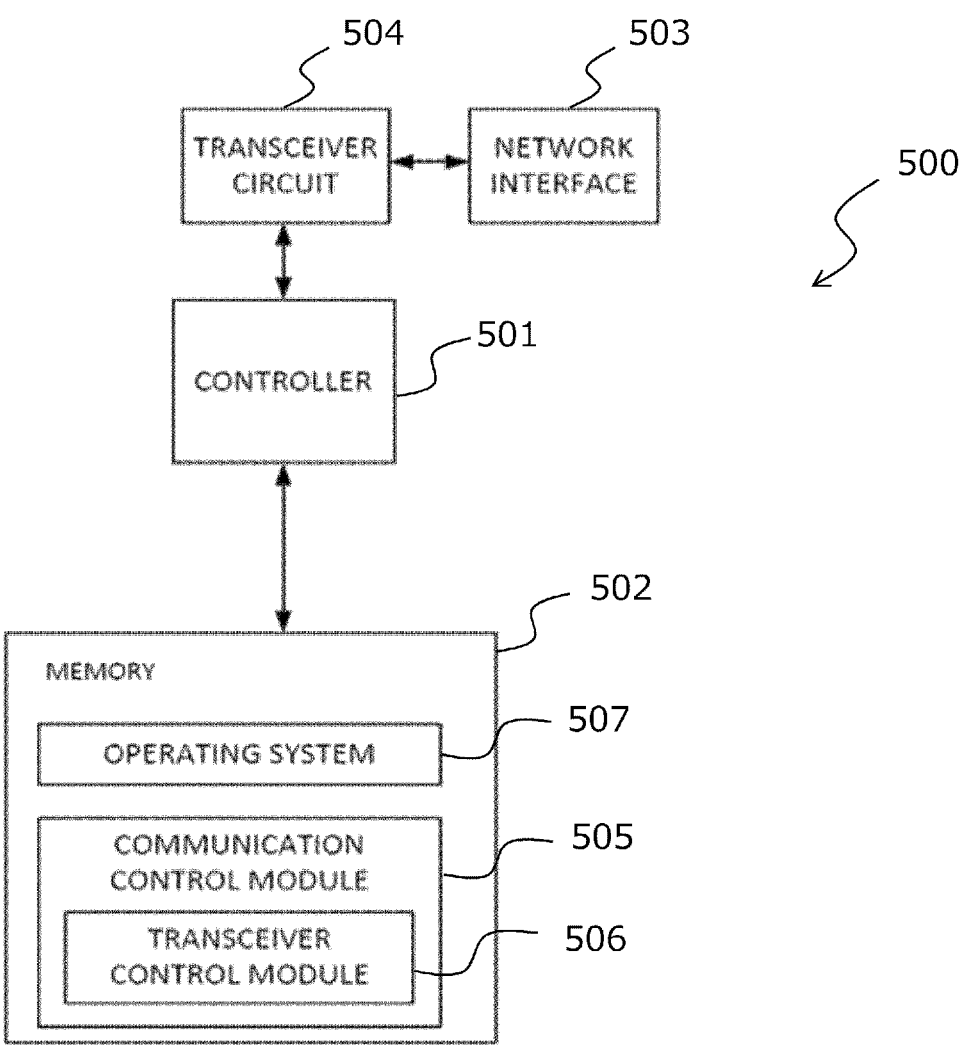
FIG. 21 illustrates a general block diagram for core network node.

FIG. 21 is a block diagram illustrating the main components of an exemplary core network node 500, for example an AMF, a SMF, a SEAF (SEcurity Anchor Function), an AUSF, an UPF, an UDM, an ARPF, a NEF, a GMF or any other core network node. The AMF may be an alternative to the SEAF. The core network node is included in the 5GC. As shown, the core network node 500 includes a transceiver circuit 504 which is operable to transmit signals to and to receive signals from other nodes (including the UE) via a network interface 503. A controller 501 controls the operation of the core network node 500 in accordance with software stored in a memory 502. For example, the controller 501 may be realized by Central Processing Unit (CPU). Software may be pre-installed in the memory 502 and/or may be downloaded via the telecommunication network or from a removable data storage device (RMD), for example. The software includes, among other things, an operating system 507 and a communications control module 505 having at least a transceiver control module 506.

The communications control module 505 (using its transceiver control sub-module) is responsible for handling (generating/sending/receiving) signalling between the core network node 500 and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC)

devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0 (2016-03), Annex B, the contents of which are incorporated herein by reference). This list is not exhaustive and is intended to be indicative of some examples of machine type communication applications.

TABLE 1

Some examples of machine type communication applications.

| Service Area | MTC applications |
|---|---|
| Security | Surveillance systems |
| | Backup for landline |
| | Control of physical access (e.g. |
| | to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/ Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary aspects described in the present document. Needless to say, these technical ideas and aspects are not limited to the above-described UE and various modifications can be made thereto.

As will be appreciated by one of skill in the art, the present disclosure may be embodied as a method, and system. Accordingly, the present disclosure may take the form of an entirely hardware aspect, a software aspect or an aspect combining software and hardware aspects.

It will be understood that each block of the block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. A general-purpose processor may be a microprocessor, but in the alternative, the processor may be any conventional processor, controller, microcontroller, or state machine. A processor may also be implemented as a combination of computing devices, e.g., a plurality of microprocessors, one or more microprocessors, or any other such configuration.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC.

The previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

This application is based upon and claims the benefit of priority from Indian patent applications No. 201841041573, filed on Nov. 2, 2018, the disclosure of which is incorporated herein in its entirety by reference.

REFERENCE SIGNS LIST

300 UE
301 controller
302 memory
303 user interface
304 transceiver circuit
305 antenna
306 communication control module
307 transceiver control module
308 operating system
400 (R)AN node
401 controller
402 memory
403 network interface
404 transceiver circuit
405 antenna
406 communications control module

407 transceiver control module
408 operating system
500 core network node
501 controller
502 memory
503 network interface
504 transceiver circuit
505 communications control module
506 transceiver control module
507 operating system

What is claimed is:

1. A communication method of a first network node for group management, the method comprising:

receiving, from a second network node, a request message for establishing group communication, and creating a group related to 5G Local Area Network (LAN)-Type communication, wherein the first network node is connected to a network with an Unified Data Management (UDM), which, in a case where members of the group changes, notifies subscription data for a User Equipment (UE) to an Access and Mobility Management Function (AMF) that determines information for 5G LAN-type service based on the subscription data for the UE, wherein the subscription data for the UE is notified to the AMF based on a request from Application Function (AF), and wherein the request comprises a list of Generic Public Subscription Identifier (GPSI) and an External Group Identifier to identify the group for the 5G LAN-type service.

2. A first network node for group management comprising:

a memory storing instructions; and a processor configured to execute the instructions to:

receive, from a second network node, a request message for establishing group communication, and create a group related to 5G Local Area Network (LAN)-Type communication, wherein the first network node is connected to a network with an Unified Data Management (UDM), which, in a case where members of the group changes, notifies subscription data for a User Equipment (UE) to an Access and Mobility Management Function (AMF) that determines information for 5G LAN-type service based on the subscription data for the UE, wherein the subscription data for the UE is notified to the AMF based on a request from Application Function (AF), and wherein the request comprises a list of Generic Public Subscription Identifier (GPSI) and an External Group Identifier to identify the group for the 5G LAN-type service.

* * * * *